(12) United States Patent
Gloudemans et al.

(10) Patent No.: US 8,154,633 B2
(45) Date of Patent: Apr. 10, 2012

(54) LINE REMOVAL AND OBJECT DETECTION IN AN IMAGE

(75) Inventors: James R. Gloudemans, San Mateo, CA (US); Walter Hsiao, Mountain View, CA (US); Felicia Yue, Yorktown Heights, NY (US)

(73) Assignee: Sportvision, Inc., Chicago, IL (US)

( * ) Notice: Subject to any disclaimer, the term of this patent is extended or adjusted under 35 U.S.C. 154(b) by 983 days.

(21) Appl. No.: 12/121,650

(22) Filed: May 15, 2008

(65) Prior Publication Data

US 2009/0128667 A1   May 21, 2009

Related U.S. Application Data

(60) Provisional application No. 60/988,725, filed on Nov. 16, 2007.

(51) Int. Cl.
*H04N 9/64* (2006.01)
*H04N 7/18* (2006.01)

(52) U.S. Cl. .................................. 348/251; 348/157
(58) Field of Classification Search .................. 348/241, 348/157, 159, 149, 143, 251
See application file for complete search history.

(56) References Cited

U.S. PATENT DOCUMENTS

| | | | |
|---|---|---|---|
| 3,069,654 A | 12/1962 | Hough | |
| 4,956,706 A | 9/1990 | Ohba | |
| 5,487,172 A * | 1/1996 | Hyatt | 712/32 |
| 5,850,352 A | 12/1998 | Moezzi et al. | |
| 5,912,700 A | 6/1999 | Honey et al. | |
| 6,133,946 A | 10/2000 | Cavallaro et al. | |
| 6,380,933 B1 | 4/2002 | Sharir et al. | |
| 6,671,390 B1 * | 12/2003 | Barbour et al. | 382/103 |
| 6,795,567 B1 | 9/2004 | Cham et al. | |
| 7,099,494 B2 | 8/2006 | Park et al. | |
| 7,194,110 B2 | 3/2007 | Qian | |

(Continued)

FOREIGN PATENT DOCUMENTS

WO    WO 9630860 A2 * 10/1996

OTHER PUBLICATIONS

Communication Relating to the Search Results of the Partial International Search dated Feb. 17, 2009 in International Application No. PCT/US2008/083415.

(Continued)

*Primary Examiner* — David Ometz
*Assistant Examiner* — Ahmed A Berhan
(74) *Attorney, Agent, or Firm* — Vierra Magen Marcus & DeNiro LLP

(57) ABSTRACT

In one aspect, lines in image data of an event are automatically found and repaired. For example, the event may be a sporting event which is played on a field, and the line segment is a field line on the field which may be obscured by a player, game ball or other object. The line segment is automatically detected in a mask image, and a portion of the line segment which is occluded by the object is automatically determined, and the object is automatically removed. The line segment can also be repaired. Optionally, a virtual viewpoint of the event is provided from the image, with the line repaired and the object removed. In another aspect, an object in an image of an event is automatically located by detecting blobs in the image which meet at least one specified criterion, such as size, aspect ratio, density or color profile.

8 Claims, 35 Drawing Sheets

U.S. PATENT DOCUMENTS

| | | | |
|---|---|---|---|
| 7,230,658 | B2 | 6/2007 | Chae |
| 7,283,901 | B2 | 10/2007 | Luo et al. |
| 7,289,648 | B2 | 10/2007 | Liu |
| 2002/0158873 | A1 | 10/2002 | Williamson |
| 2005/0018045 | A1* | 1/2005 | Thomas et al. ............... 348/157 |
| 2006/0028476 | A1 | 2/2006 | Sobel |
| 2007/0104351 | A1 | 5/2007 | Yang et al. |
| 2008/0049123 | A1 | 2/2008 | Gloudemans et al. |

OTHER PUBLICATIONS

K. Matsui, et al., "Soccer Image Sequence Computed by a Virtual Camera," Proceedings of Conference on Computed Vision and Pattern Recognition, Santa Barbara, CA, pp. 860-865, Jun. 23, 1998.

J. Song, et al., "A New Approach for Line Recognition in Large-size Images Using Hough Transform," Proceedings of International Conference on Pattern Recognition, Quebec City, Canada, vol. 1, pp. 33-36, Aug. 11, 2002.

D. Kang, et al., "Finding and Tracking Road Lanes Using Line-Snakes," Proceedings of the Intelligent Vehicles Symposium, Tokyo, Japan, pp. 184-194, Sep. 19, 1996.

M. Yang, et al., "Hough Transform Modified by Line Connectivity and Line Thickness," IEEE Transactions on Pattern Analysis and Machine Intelligence, vol. 19, No. 8, pp. 905-910, Aug. 1, 1997.

N. Ahmed et al., "Automatic Generation of Personalized Human Avatars from Multi-view Video," Proceedings of the ACM symposium on Virtual reality software and technology, 2005, p. 257-260, Monterey, California.

G. Bradski et al., "Learning-Based Computer Vision with Intel's Open Source Computer Vision Library," Intel Corporation Journal, vol. 09, Issue 02, Published May 19, 2005, pp. 119-130.

Hoiem et al., "Automatic Photo Pop-up," ACM SIGGRAPH 2005, Int. Conf. on Computer Graphics and Interactive Techniques, 2005.

A. Criminisi, "Single-View Metrology: Algorithms and Applications," DAGM-Symposium 2002, The German Association for Pattern Recognition, pp. 224-239, 2002, Zurich, Switzerland.

C. Frueh et al., "Automated Texture Mapping of 3D City Models With Oblique Aerial Imagery," Proc. 2nd Int. Symp. on 3D Data Processing, Visualization and Transmission, 3DPVT 2004, Sep. 2004, pp. 396-403.

O. Grau et al., "Use of 3-D Techniques for Virtual Production," BBC Research & Development White Paper WHP 033, Jul. 2002.

D. Hoiem et al., "Geometric Context From a Single Image," 10th IEEE Int. Conf. on Computer Vision, Oct. 2005.

IBC2006 Innovation Awards, "The Piero Sports Graphics Project," BBC Research and Development and Red Bee Media, printed from http://www.ibc.org/cgi-bin/displaypage.cgi?pageref=2053 on Jun. 13, 2007.

C.S. Lee et al., "Carrying Object Detection Using Pose Preserving Dynamic Shape Models," Conf. on Articulated Motion and Deformable Objects (AMDO) 2006, pp. 315-325.

C. Malerczyk et al., "3D Reconstruction of Sports Events for Digital TV," Journal of WSCG (Winter School on Computer Graphics), vol. 11, No. 1, Feb. 3-7, 2003, Plzen, Czech Republic.

Press Release, Orad Hi-Tec Systems Ltd., "Orad unveils 3DReplay, its revolutionary HD/SD soccer analysis system at NAB 2007," printed from http://www.orad.co.il/en/page.asp?id=188 on Jun. 13, 2007.

F. Remondino et al., "Human Motion Reconstruction and Animation from Video Sequences," 17th Int. Conf. on Computer Animation and Social Agents (CASA2004), pp. 347-354. Computer Graphics Society (CGS), Geneva, Switzerland, Jul. 7-9, 2004.

RedBee Design Systems, "Virtual Graphics and Sport Analysis (Piero)," printed from http://www.redbeemedia.com/designsystems/new_product.shtmls, Nov. 8, 2007.

BBC Research, "Projects: Piero," printed from http://www.bbc.co.uk/rd/projects/virtual/piero/index.shtml on Jun. 13, 2007.

A. Soh, et al. "Texture Mapping of 3D Human Face for Virtual Reality Environments," Int. J. of Information Technology vol. 8, No. 2, Sep. 2002.

M. Uriol, "Video-Based Avatar Reconstruction and Motion Capture," University of California, Irvine, Dissertation, 2005.

W.S. Lee et al., "Generating Animatable 3D Virtual Humans From Photographs," Proc. Eurographics 2000, vol. 19, No. 3, pp. 1-10, Aug. 2000.

Zheng et al., "Interactive Human Motion Acquisition from Video Sequences," Proc. Computer Graphics Int., Geneva, Switzerland, Jun. 2000.

T. Bebie et al., "SoccerMan—Reconstructing Soccer Games from Video Sequences," Proceedings of the 1998 Int. Conf. on Image Processing, vol. 1, pp. 898-902, Oct. 1998.

"Peiro, Putting a new perspective on sport," printed from http://www.redbeemedia.com/piero/index.shtml on Jun. 13, 2007.

"Single view modeling," Univ. of Washington, printed from http://grail.cs.washington.edu/projects/svm/ on Jun. 13, 2007.

R. Tsai, "A Versatile Camera Calibration Technique for High-Accuracy 3D Machine Vision Metrology Using Off-the-Shelf TV Cameras and Lenses", IEEE Journal of Robotics and Automation, vol. RA-3, No. 4, Aug. 1987, pp. 323-344.

E. Trucco et al., "Introductory techniques for 3-D computer vision," chapter 6, Prentice Hall, 1998.

T. Bebie et al., "A Video-Based 3D-Reconstruction of Soccer Games," Computer Graphics Forum 19(3), p. 391-400 (2000).

U.S. Appl. No. 12/121,665, filed May 15, 2008, titled "User Interface for Accessing Virtual Viewpoint Animations."

U.S. Appl. No. 12/121,660, filed May 15, 2008, titled "Image Repair Interface For Providing Virtual Viewpoints."

U.S. Appl. No. 12/121,696, filed May 15, 2008, titled "Virtual Viewpoint Animation."

U.S. Appl. No. 12/121,699, filed May 15, 2008, titled "Fading Techniques for Virtual Viewpoint Animations."

U.S. Appl. No. 12/121,701, filed May 15, 2008, titled "Updating Background Texture for Virtual Viewpoint Animations."

U.S. Appl. No. 12/121,655, filed May 15, 2008, titled "3d Textured Objects for Virtual Viewpoint Animations."

Notification of International Preliminary Report on Patentability and the Written Opinion of the International Searching Authority dated May 27, 2010 in PCT Application No. PCT/US2008/083415.

Huang, Yu et al., "Players and Ball Detection in Soccer Videos Based on Color Segmentation and Shape Analysis", Multimedia Content Analysis and Mining; [Lecture Notes in Computer Science (LNCS)], Jun. 30, 2007, pp. 416-425, vol. 4577, Springer Berlin Heidelberg, Berlin, Heidelberg.

Hew, Patrick, "Extracting Blobs from Raster Images", Honours Dissertation, Oct. 2, 1995, pp. 1-80, University of Western Australia.

Trivedi, Mohan et al., "Distributed Interactive Video Arrays for Event Capture and Enhanced Situational Awareness", IEEE Intelligent Systems, Sep. 2005, pp. 58-66, vol. 20, No. 5, IEEE Educational Activities Department, Piscataway, NJ, USA.

Mavromatis, S et al., "3D Reconstruction of Soccer Sequences Using Non-calibrated Video Cameras", Image Analysis and Recognition, [Lecture Notes in Computer Science], Aug. 22, 2007, pp. 1254-1264, vol. 4633, Springer Berlin Heidelberg, Berlin, Heidelberg.

International Search Report and Written Opinion of the International Searching Authority dated Jul. 31, 2009, in PCT Application No. PCT/US2008/083415.

Communication pursuant to Rules 161(1) and 162 EPC dated Jul. 7, 2010, in European Application No. 08850327.1 filed Nov. 13, 2008.

Amendment dated Aug. 17, 2010, in European Application No. 08850327.1 filed Nov. 13, 2008.

* cited by examiner

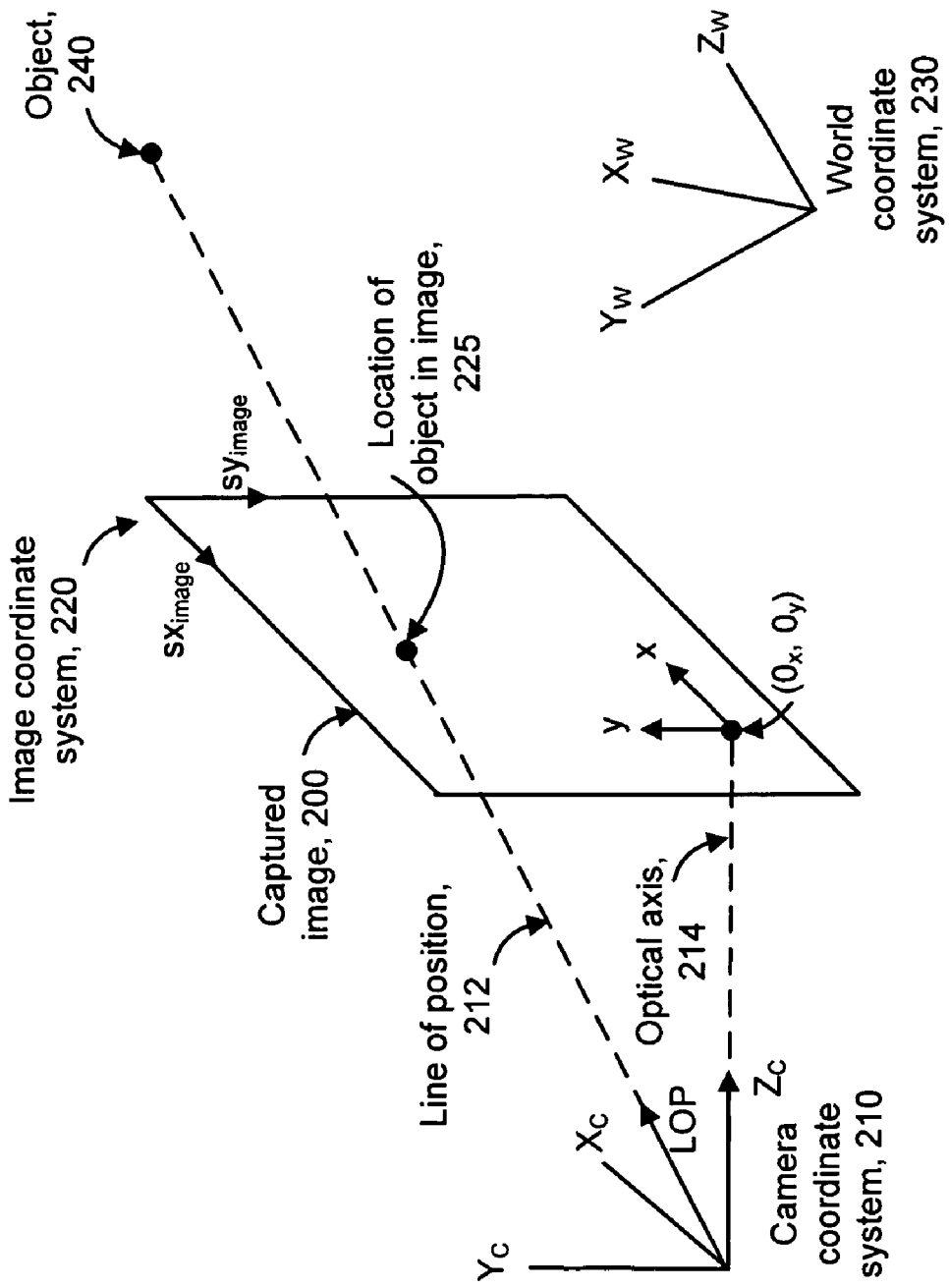

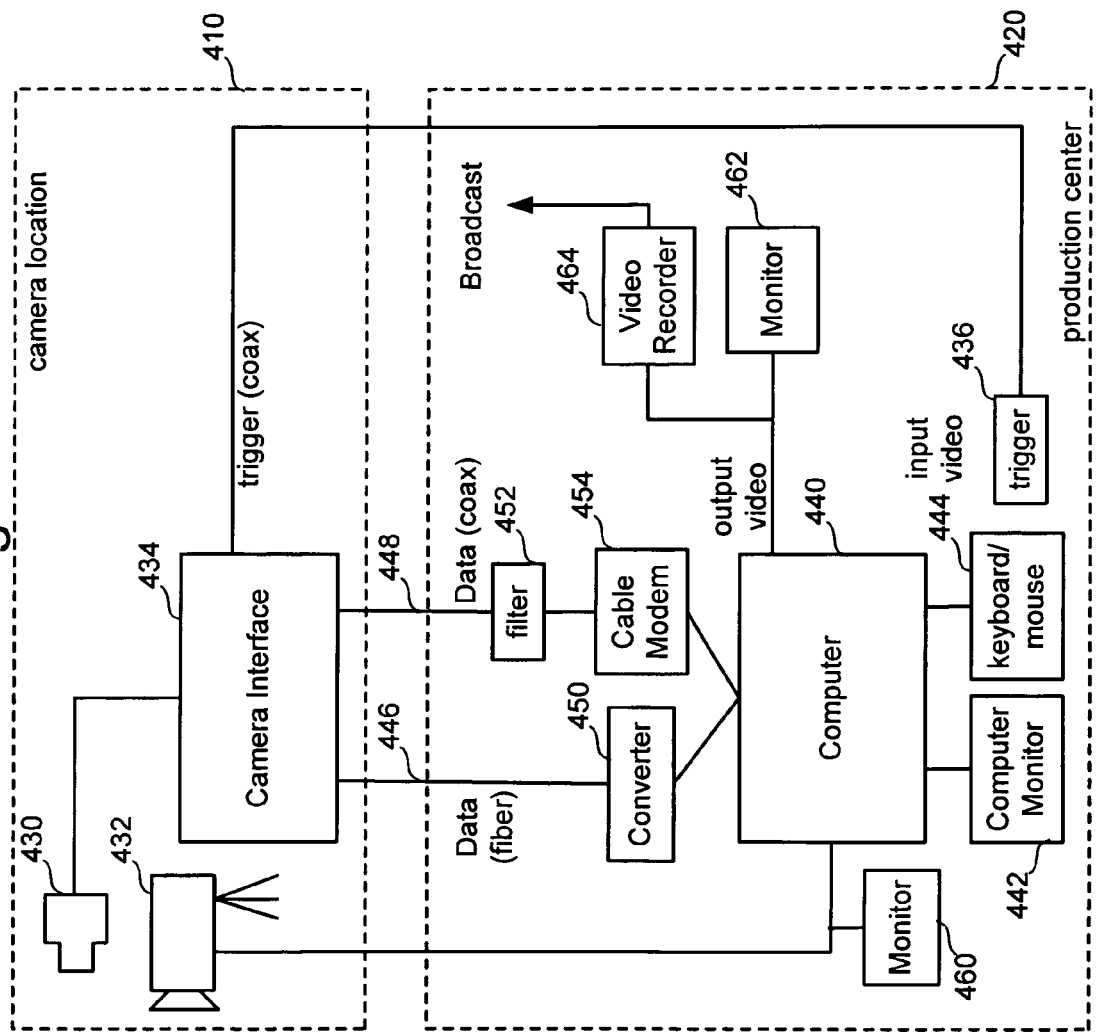

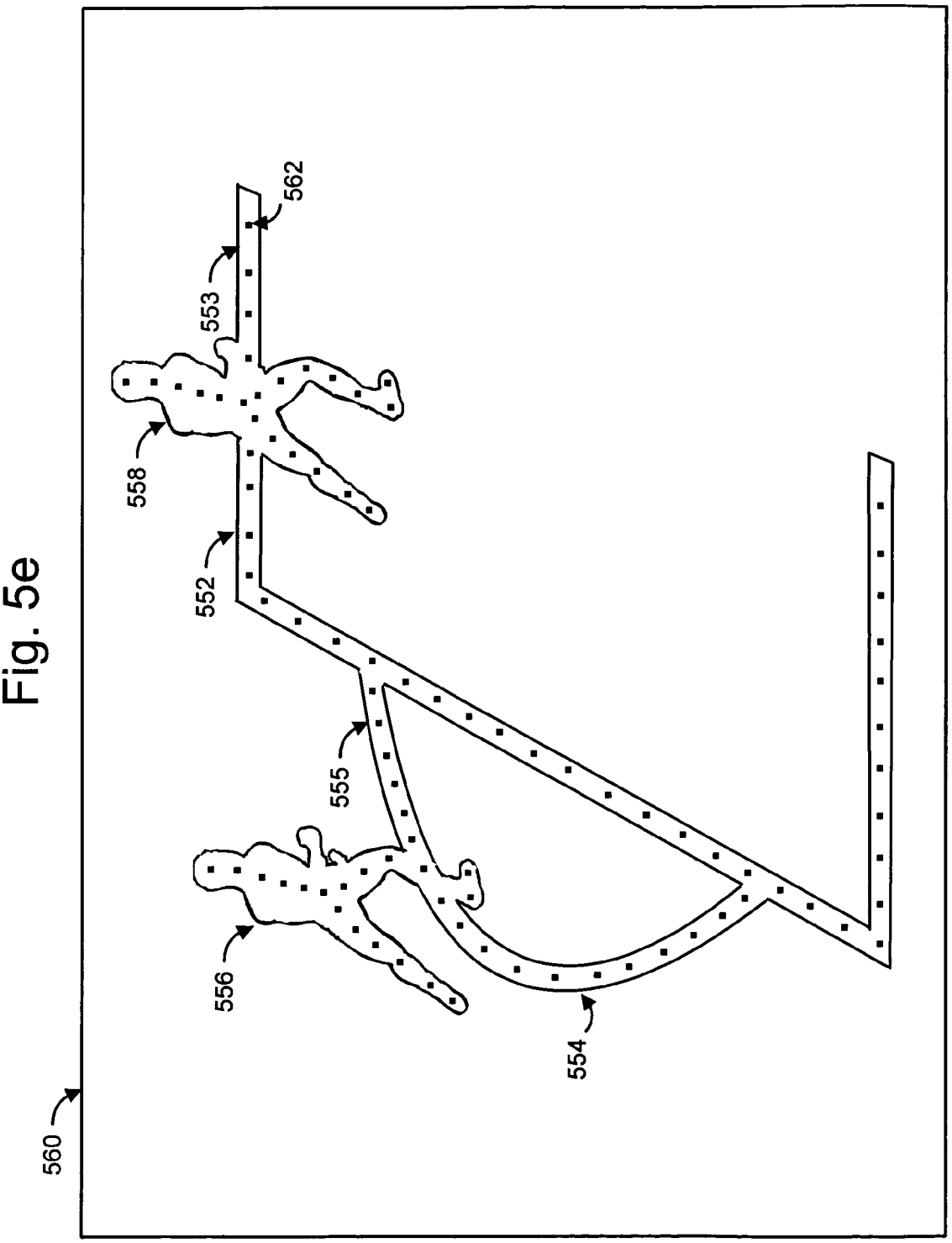

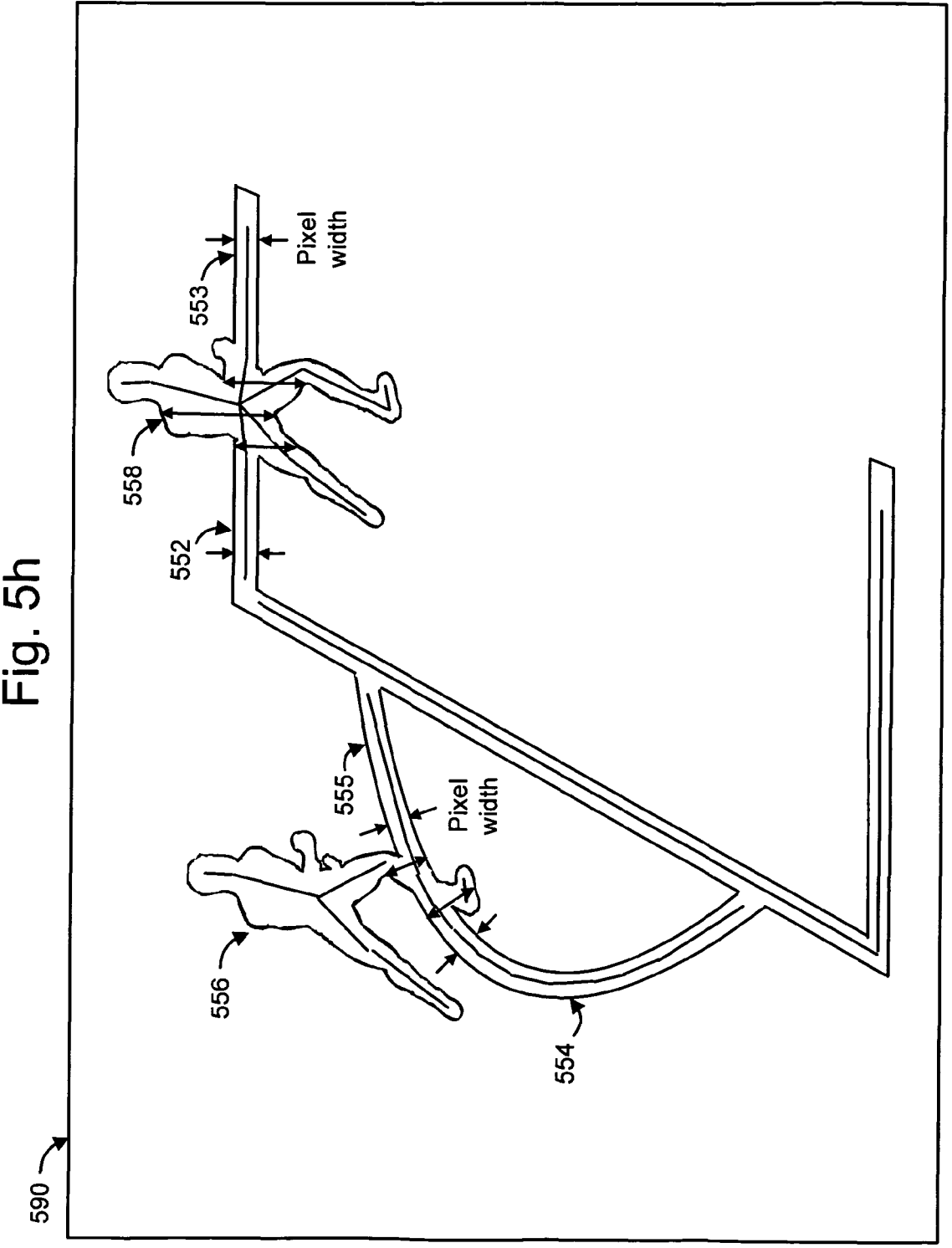

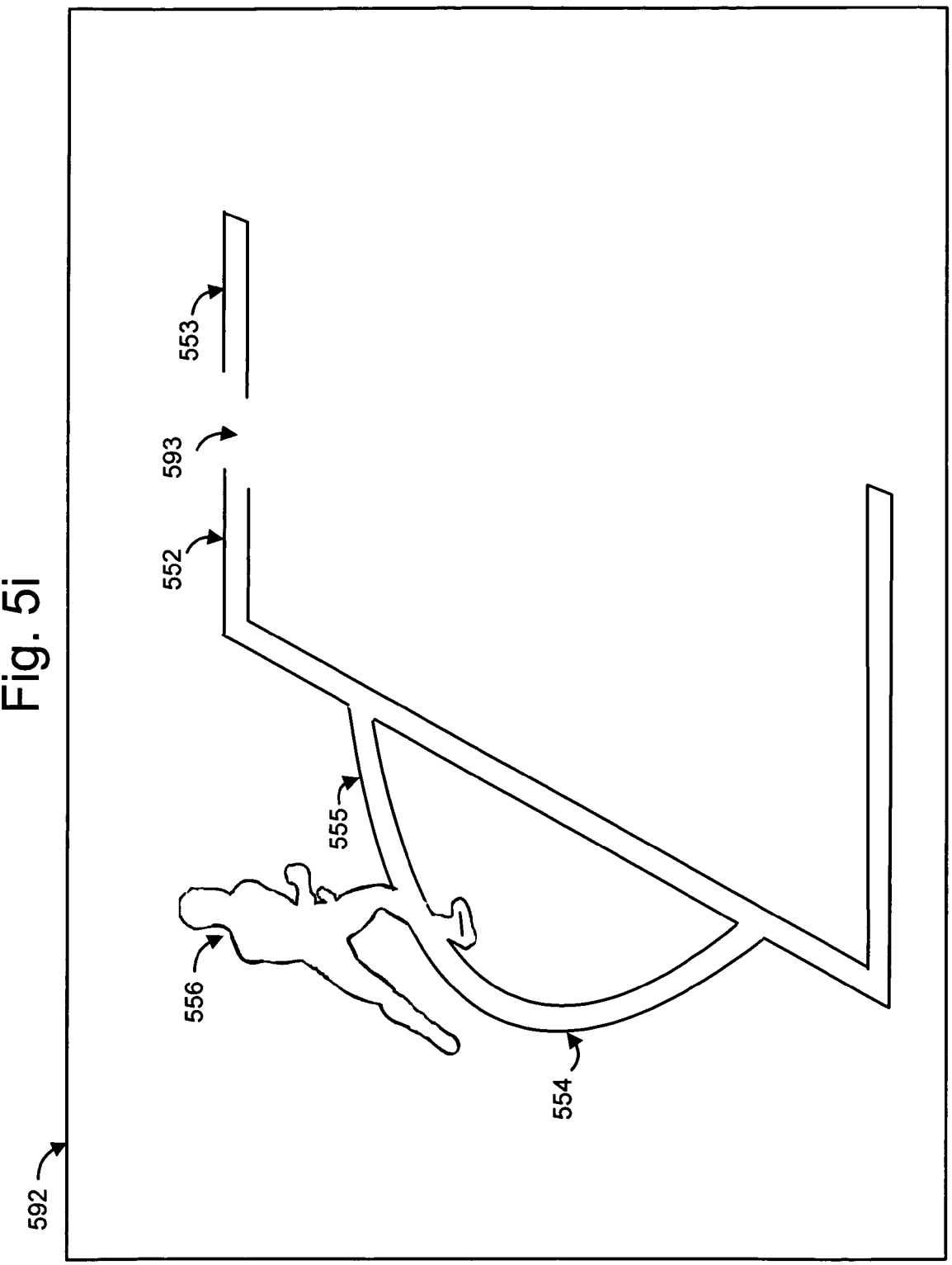

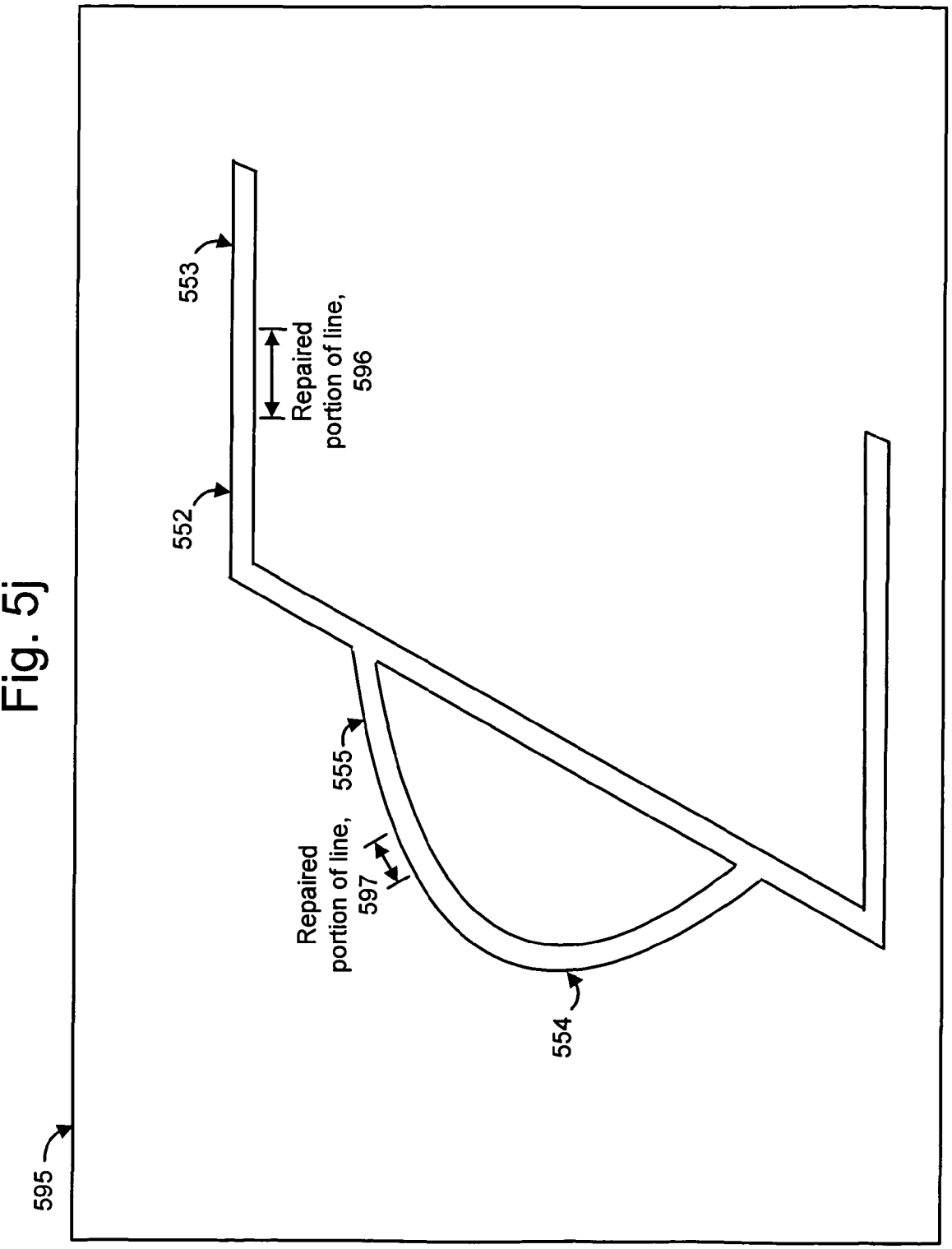

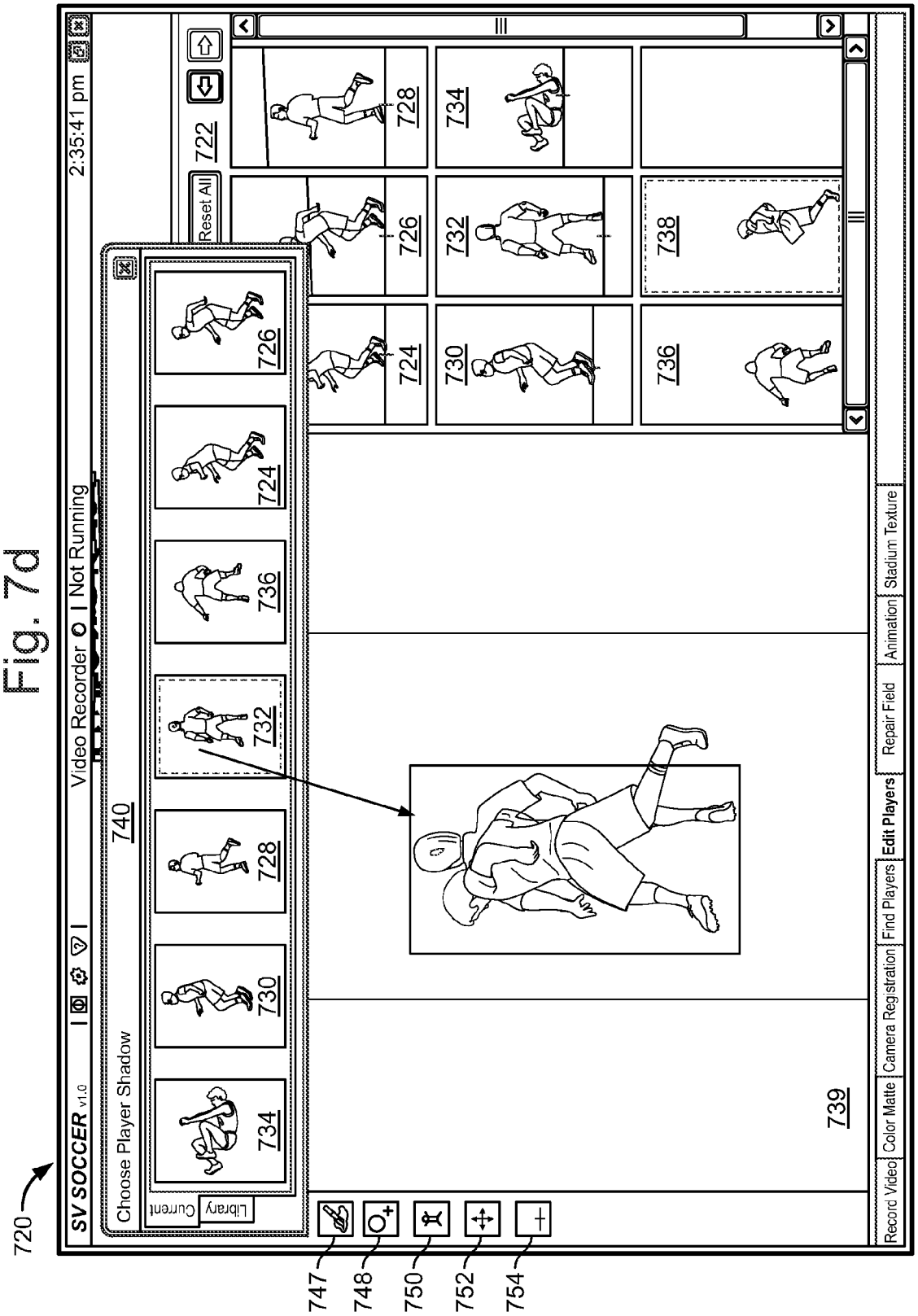

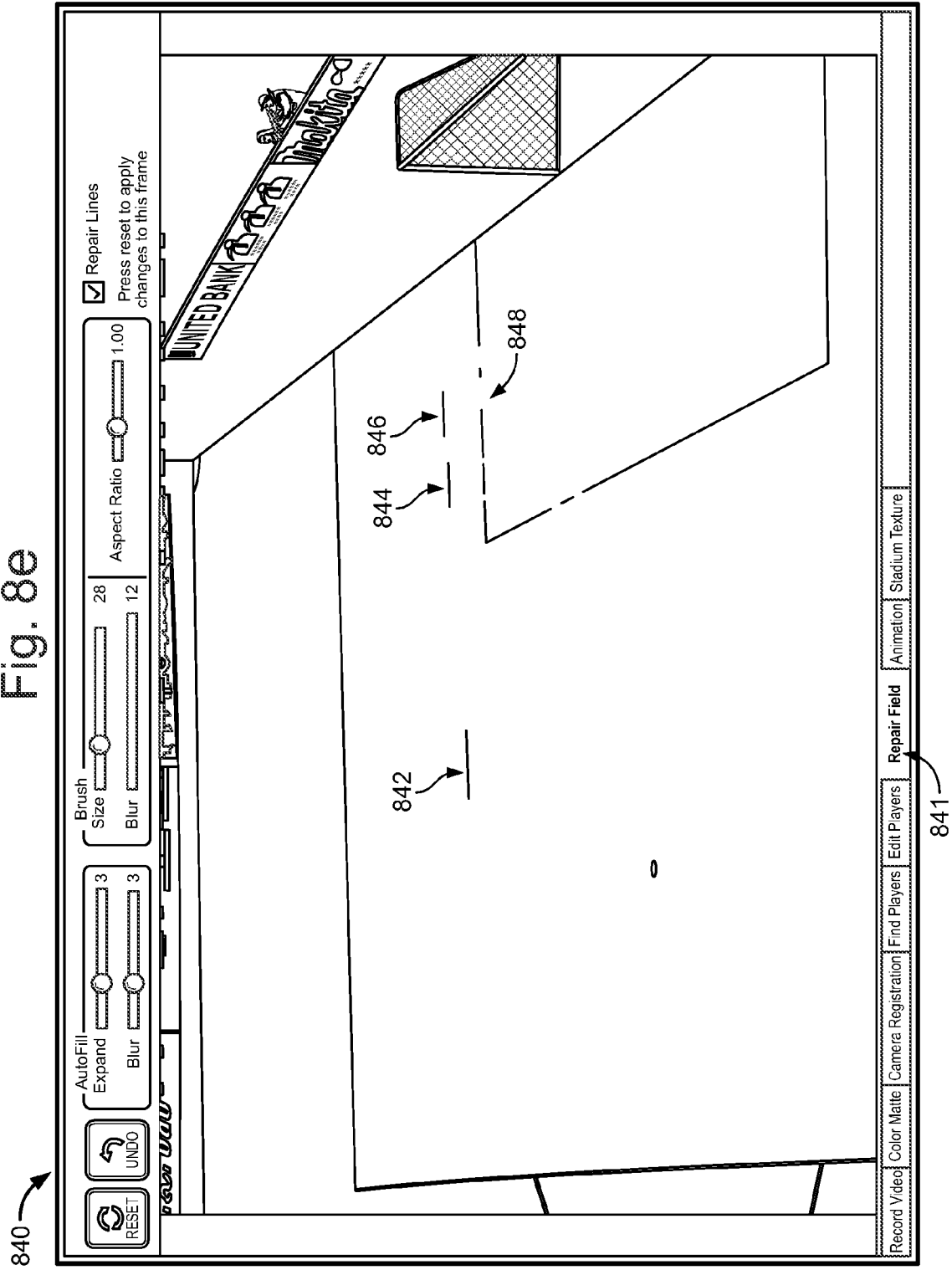

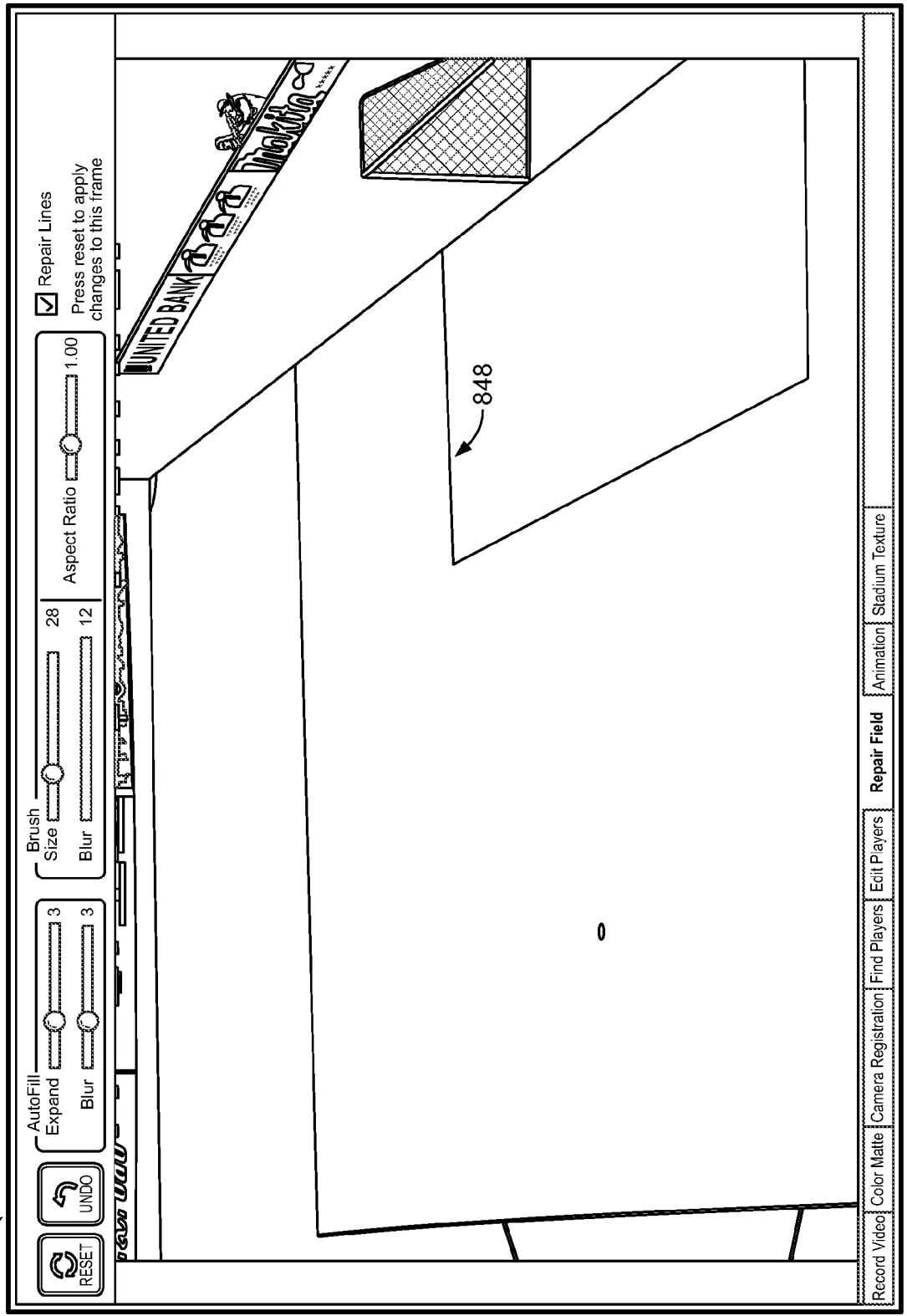

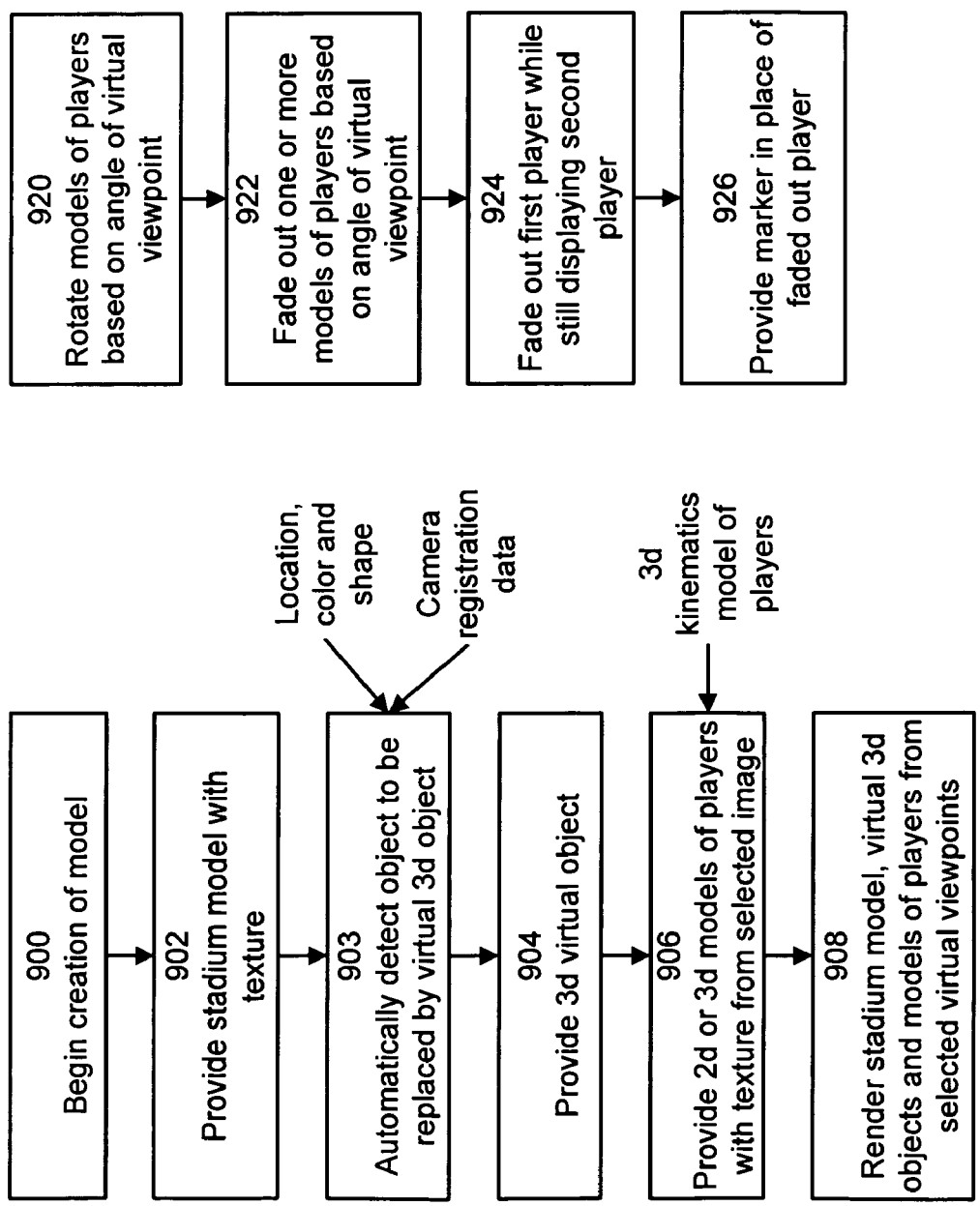

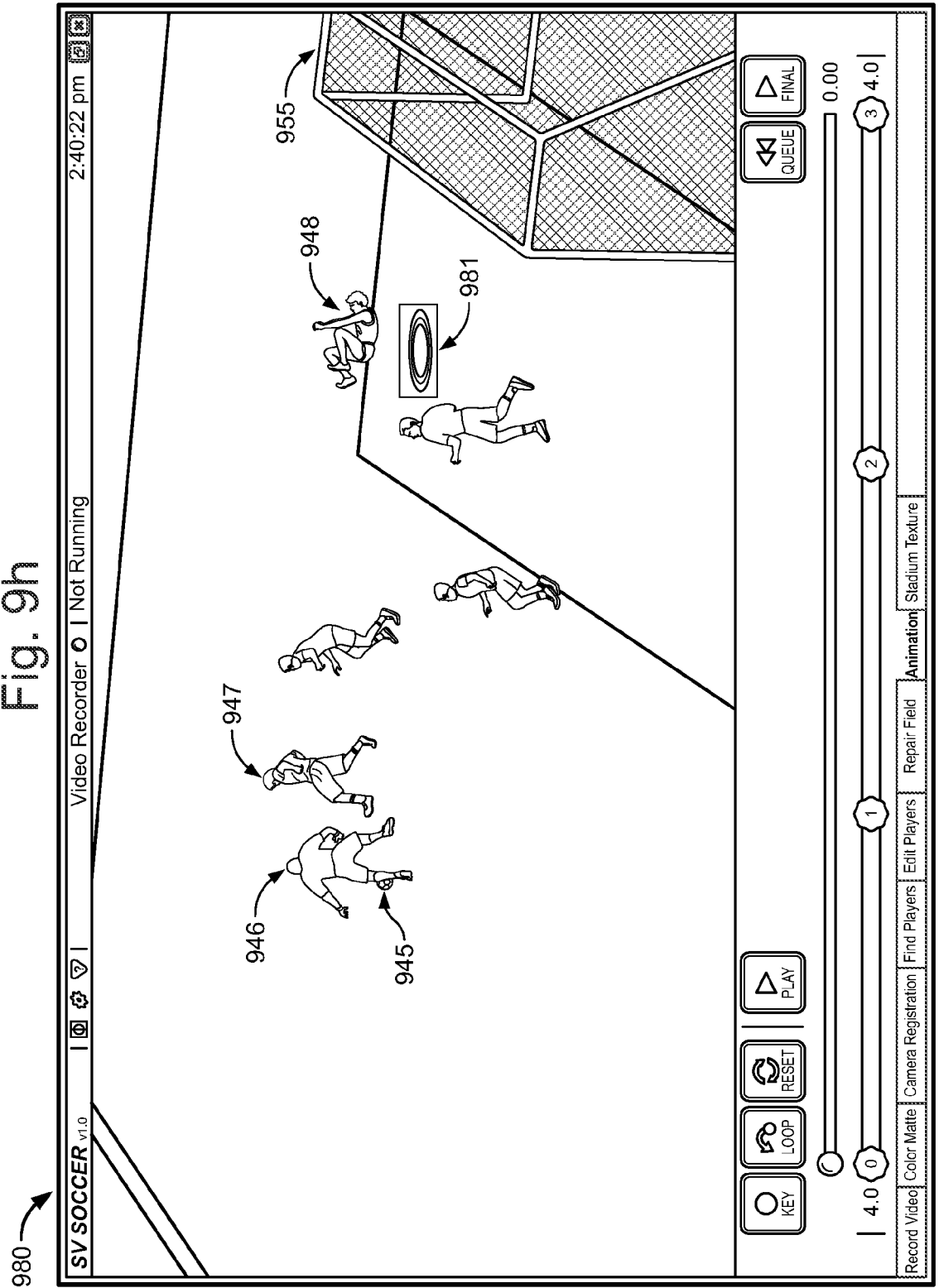

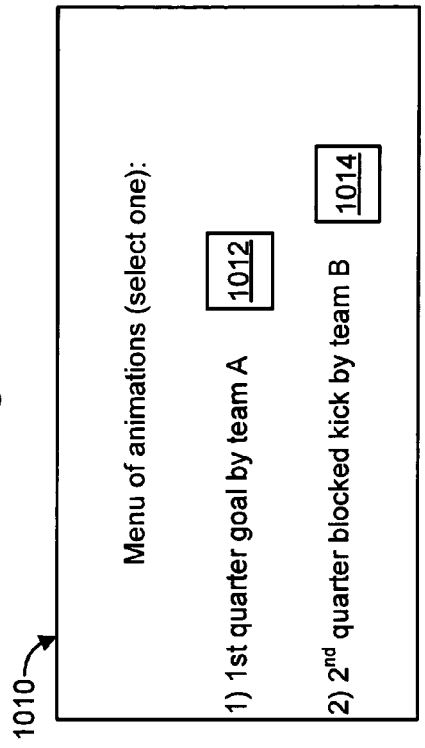
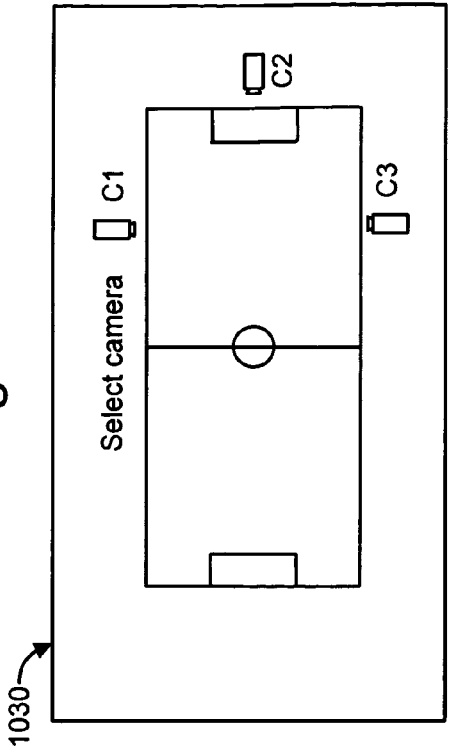
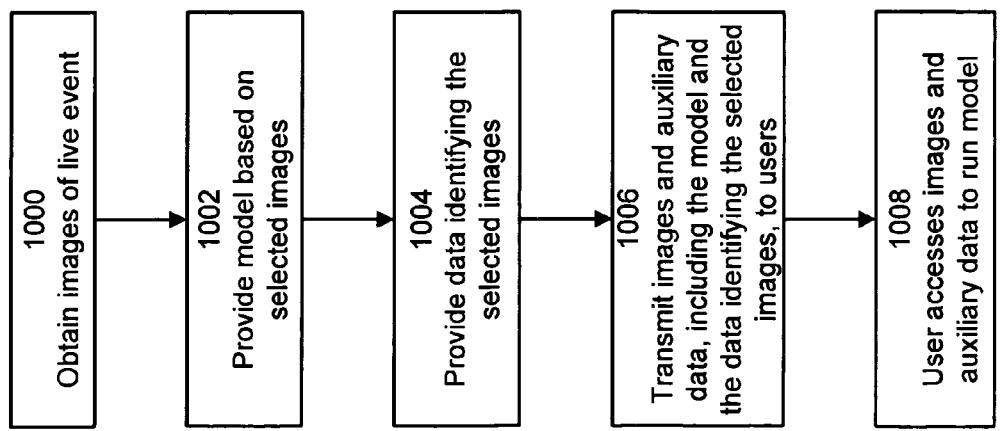

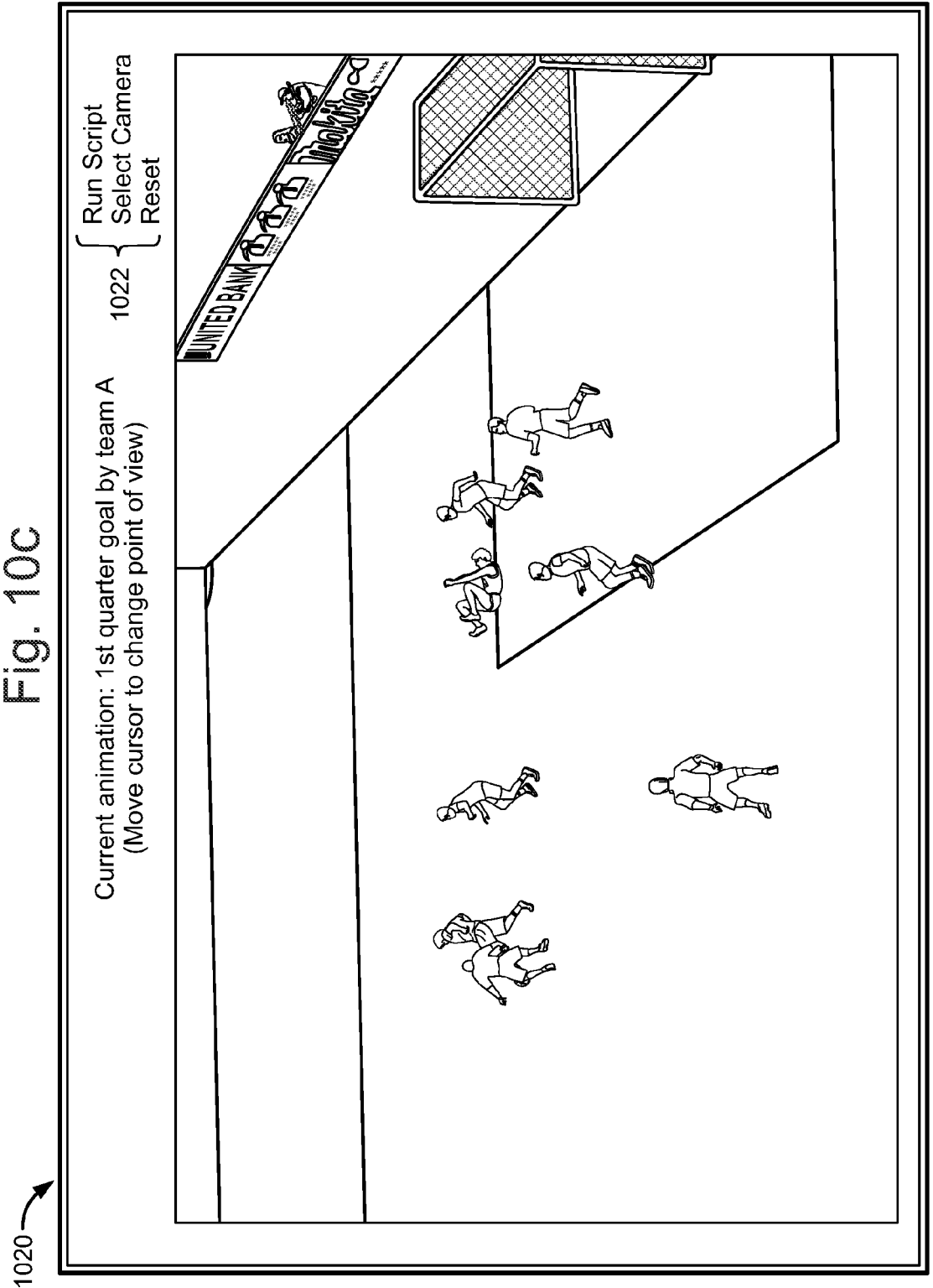

LINE REMOVAL AND OBJECT DETECTION IN AN IMAGE

CROSS-REFERENCE TO RELATED APPLICATIONS

This application claims the benefit of U.S. provisional pat. app. 60/988,725, filed Nov. 16, 2007, titled "Changing The Perspective Of A Camera In An Image," SPTV-01113US0), incorporated herein by reference.

BACKGROUND OF THE INVENTION

Various techniques have been developed for enhancing video broadcasts of live events. Broadcasts can be enhanced to assist the human viewer in following the action of the live event as well as providing entertainment and educational benefits. For example, a replay of a particular event, such as the scoring of a goal in a soccer match, can assist the viewer in comprehending the finer points of the game, including the movement and positioning of the players. However, replays are conventionally limited to depicting the viewpoint of one or more cameras. Due to safety and practical considerations, cameras cannot always be positioned in locations which capture the action from a desired viewpoint. As a result, the images obtained may not capture the most important action, for instance, due to one player occluding another.

SUMMARY OF THE INVENTION

The present invention addresses the above and other issues by providing a system and method for providing images of an event from different virtual viewpoints.

One embodiment involves finding lines in an image, such as lines on a field in a sporting event, and removing any occluding objects such as players on the field. For example, a method for automatically finding and repairing lines in image data of an event includes obtaining an image of the event from a camera, where the event includes a scene having at least one line segment which includes a portion which is occluded by an object, and the object has a width which is greater than a width of the portion. For instance, the event may be a sporting event which is played on a field, and the line segment is a field line on the field which may be obscured by a player, game ball or other object. The line segment can be curved or straight. The method further includes forming a mask image from the image obtained from the camera, automatically detecting the at least one line segment in the mask image, automatically determining that the portion of the at least one line segment is occluded by the object, and automatically removing the object. Optionally, a virtual viewpoint of the event is provided from the image, with the line repaired and the object removed.

Another embodiment involves finding objects such as players on a field using a blob detecting technique. For example, a method for automatically finding an object in image data of an event includes obtaining an image of the event from a camera, where the image includes the object, and detecting blobs in the image. The method further includes determining if the blobs meet at least one specified criterion, such as size, aspect ratio, density or color profile, and identifying at least one of the blobs which meets the at least one specified criterion as representing the object. Optionally, blobs which do not meet the at least one specified criterion can be removed from the image while blobs which do meet the at least one specified criterion can be kept in the image, and data of a textured 3d model of the event and data from the image can be combined to depict at least one virtual viewpoint of the event which differs from a viewpoint of the camera.

In another embodiment, a system for processing image data includes at least one camera for capturing an image of an event, where the event includes a scene comprising at least one line segment which includes a portion which is occluded by an object at the event, and the object having a width which is greater than a width of the portion. The system further includes at least one processing facility which receives the image. The at least one processing facility: a) automatically finds the at least one line segment, b) removes the at least one line segment, c) after the removing, detects blobs in the image, d) determines if the blobs meet at least one specified criterion, and e) identify at least one of the detected blobs which meets the at least one specified criterion as representing the object.

Corresponding methods, systems and processor readable storage devices are provided.

BRIEF DESCRIPTION OF THE DRAWINGS

FIG. 2 depicts a relationship between camera, image and world coordinate systems.

FIG. 4 is a block diagram of one embodiment of a system which includes a conventional camera and a high resolution camera.

FIG. 5b depicts a process for finding straight lines in the line finder and repair process of FIG. 5a.

FIG. 5c depicts a process for finding curved lines in the line finder and repair process of FIG. 5a.

FIG. 5e depicts an image showing center points of masked image segments of the image of FIG. 5d.

FIG. 5h depicts an image showing pixel widths along straight and curved lines of the image of FIG. 5e.

FIG. 5i depicts an image showing removal of an object which occludes a straight line of the image of FIG. 5h.

FIG. 5j depicts an image showing removal of objects which occlude straight and curved lines of the image of FIG. 5h, and repair of the lines.

FIG. 6b depicts a video image showing bounding boxes of players which are detected by the process of FIG. 6a.

FIG. 6c depicts a video image after an operator has separated out two players from a common bounding box which was provided by the process of FIG. 6a.

FIG. 7d depicts the user interface of FIG. 7c showing a selected library image combined with the player with the missing portion.

FIG. 8e depicts a user interface for repairing a playing field.

FIG. 8f depicts the user interface of FIG. 8e after the playing field has been repaired.

FIG. 9a depicts details of a process for rendering virtual viewpoints.

FIG. 9b depicts a process for rotating and fading out players based on an angle of a virtual viewpoint.

FIG. 9c depicts a process for texturing a 3d model.

FIG. 9h depicts the third image of FIG. 9g in which one of the players is replaced by a marker.

FIG. 10a depicts a process for enabling a user to run an animation.

FIG. 10b depicts a user interface which allows a user to select from available animations.

FIG. 10c depicts a user interface which allows a user to run an animation.

FIG. 10d depicts a user interface which allows a user to select a camera viewpoint for an animation.

DETAILED DESCRIPTION

The present invention provides a system and method for providing images of an event from different virtual viewpoints.

Figure 1:
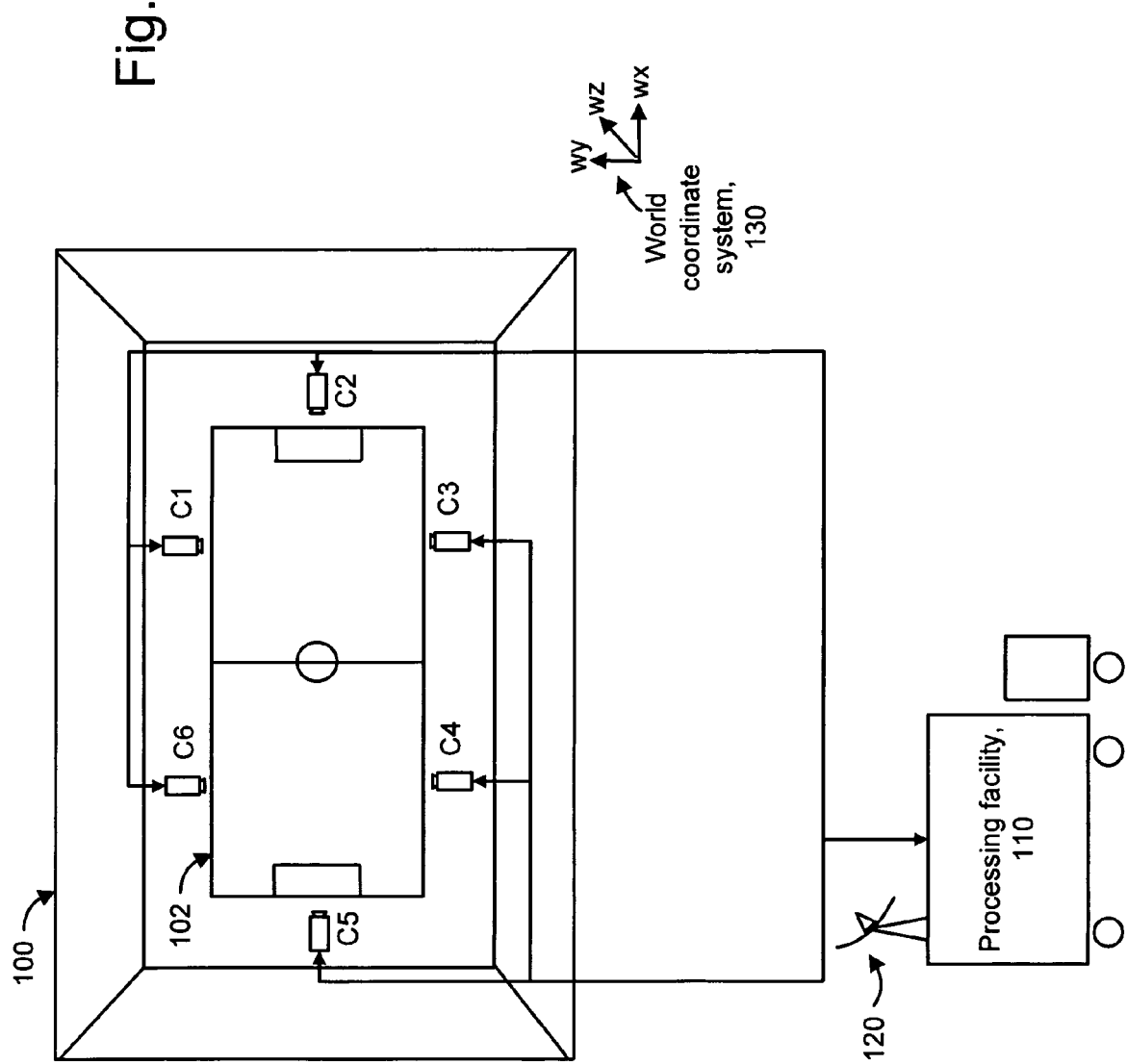
FIG. 1 depicts a system for capturing and processing images from an event.

FIG. 1 depicts a system for capturing and processing images from an event. One possible example of an event is a live event such as a sporting event, e.g., a soccer match which is played on a field 102 in a stadium 100 or other event facility. Although a soccer match is discussed as an example, the techniques discussed herein are suitable for use with other sporting events as well, such as football, rugby, track and field events, baseball, basketball, tennis, hockey, lacrosse, ice skating, dancing exhibitions and so forth. Further, the techniques discussed herein are suitable for use with other live events besides sporting events. The techniques discussed herein are also suitable for prior recorded events of any type.

Cameras C1-C6 are positioned at different locations around the field 102 to capture images of the live event. The arrangement of cameras shown is an example only. Other views, including overhead views, views from the grandstands, and so forth can also be provided. Moving cameras can also be used.

The cameras C1-C6 can be television broadcast cameras, for instance, which capture thirty frames or sixty fields per second, in one possible approach. In an example implementation, HD-SDI 720p video uses 60 frames/sec. While such cameras sense visible light, it is also possible to use cameras that sense electromagnetic radiation outside a range of visible light, such as infrared radiation, depending on the application. Further, note that other rates of image capture can be used. The location of objects in the live event, such as players or portions of the field, can be described in terms of a world coordinate system 130, also known as a free space coordinate system, which is fixed relative to the earth or other environment of interest, in one approach. The world coordinate system 130 includes orthogonal directions represented by a wy axis, a wx axis, and a wz axis which extends out of the page. An origin of the world coordinate system can be chosen to be at a specified location relative to the event facility 100. Or, the origin can be miles away from the event. Other world coordinate systems whose axes are not orthogonal are also possible, including for example coordinate systems which use latitude, longitude and elevation, spherical coordinate systems and so forth.

Each camera can be provided with sensors which detect intrinsic and extrinsic parameters of the camera when these parameters are variable. Intrinsic parameters, such as focal length, lens distortion and zoom setting represent characteristics of the camera design and settings, and do not depend on the position and orientation of the camera in space. Extrinsic parameters, such as tilt or pan, depend on the position and orientation of the camera in space. Such sensors can be provided using techniques known to those skilled in the art. For example, pan and tilt sensors can be attached to a tripod on which the camera is mounted. See, e.g., U.S. Pat. No. 5,912,700, issued Jun. 15, 1999, incorporated herein by reference. The sensors can be used to determine the field of view of the camera, e.g., where the camera is pointing and what it can see.

It is also possible to determine camera extrinsic and intrinsic parameters without sensors, e.g., as described in Tsai's method. See, e.g., Tsai, Roger Y., "An Efficient and Accurate Camera Calibration Technique for 3D Machine Vision," Proc. of IEEE Conf. on Computer Vision and Pattern Recognition, Miami Beach, Fla., 1986, pp. 364-374. For example, one approach to determine the intrinsic and extrinsic parameters of a camera involves placing marks in various measured or known locations in the event facility such that each mark looks different and at least one mark will always be visible to the camera while the camera is pointed at the event facility. The marks could look identical and be distinguished through other means such as arrangement or triggering/flashing. A computer using optical recognition technology can find the mark in the video frame and, based on the mark's size and position in the video frame, determine the camera parameters. Another approach to determining intrinsic and extrinsic parameters of a camera involves placing marks in various measured or known locations in the event facility such that each mark looks different, but the marks may be removed after camera parameters have been determined. A computer implementing a camera parameter estimation algorithm based on manual user interaction rather than, or in addition to, pattern recognition can determine camera parameters. It is also possible to determine camera parameters from an image containing no special marks but containing identifiable features each of whose position in space is measured at any time prior to determining camera parameters.

The cameras capture images and communicate the images in analog or digital signals by wire or other link to a processing facility 110, which can be a mobile facility parked at or near the event facility 100, in one possible approach. The processing facility 110 includes equipment which receives and stores the captured images, and processes the captured images, such as to provide an animation, as discussed further herein. In one approach, the animation can depict different virtual viewpoints of the live event from a single image from a camera, or from multiple images from multiple cameras. The virtual viewpoints can differ from the viewpoint of the camera. This allows the live event to be seen from viewpoints which are not otherwise available. The processing facility 110 can subsequently transmit the video, via an antenna 120 or optical fiber, etc., to another location such as a television broadcast facility for broadcast to viewers in their homes. In another approach, the processing facility can be remote from the event facility 100. An animation could also be created in a studio or even at the viewer's home, e.g., via a set top box.

Although examples are provided which involve broadcasts of television signals, images can similarly be communicated to end users via a network such as the Internet, or a cell phone network, to computing devices such desktop computers, laptops, cell phones with image rendering capabilities, portable digital assistants and the like. In one approach, the images are streamed to a computing device. The images can similarly be downloaded as one or more files from a server. It is also possible to transmit the animation (or data to compute the animation) via a separate mechanism or channel from that which transmits the video "program".

FIG. 2 depicts a relationship between camera, image and world coordinate systems. A camera coordinate system 210, which includes orthogonal axes $X_C$, $Y_C$ and $Z_C$ in three dimensions, is fixed relative to the camera. The origin of the coordinate system may be at the front nodal point of the lens, in one possible approach, modeling the camera as a pinhole camera. An image coordinate system 220, also referred to as pixel space, includes orthogonal axes X and Y in two-dimensions, and is fixed relative to a captured image 200. A world coordinate system 230, which includes orthogonal axes $X_W$, $Y_W$ and $Z_W$, is fixed relative to, e.g., the earth, the site of a live event such as a stadium, or other reference point or location. The position and/or path of the object 240 can be determined in the world coordinate system 230 in one possible approach, e.g. using GPS data or other approaches. The line of position 212 is an imaginary line which extends from the camera position (which in this case is at the origin of the camera coordinate system 210) through a pixel in the image 200, intersecting the pixel at a point 225, and through the object 240. Each pixel in the image 200 corresponds to a different line of position. Point 225 in the captured image 200 represents the location of the object 240 in the image. The location of the object in the image 200 can be represented by coordinates (sx, sy) in a coordinate system which has its origin at a corner of the image, in one approach. The coordinates may identify the center of the object.

Further, the line of position can be represented by a vector (LOP) which has unity magnitude, in one approach. The vector can be defined by two points along the LOP. The vector can be represented in the world coordinate system 230 using an appropriate transformation from the image coordinate system.

The $Z_C$ axis of the camera coordinate system, which is the optical axis 214 of the camera, intersects the captured image at a point represented by coordinates $(0_x, 0_y)$. A two-dimensional coordinate system extending from $(0_x, 0_y)$ can also be defined.

The camera registration process involves obtaining one or more transformation matrices or functions which provide a conversion between the image coordinate system 220 and the world coordinate system 230. The transformation functions may include non-linear functions, for example in transforming pixel coordinates from a distorting lens to undistorted positions. Further information can be found in E. Trucco and A. Verri, "Introductory techniques for 3-D computer vision," chapter 6, Prentice Hall, 1998, U.S. Pat. No. 5,912,700, issued Jun. 15, 1999, and U.S. Pat. No. 6,133,946, issued Oct. 17, 2000, each of which is incorporated herein by reference. In one approach, we can use a Levenberg-Marquardt algorithm non-linear optimizer to compute camera parameters given the pixel locations of known 3D features.

Figure 3B:
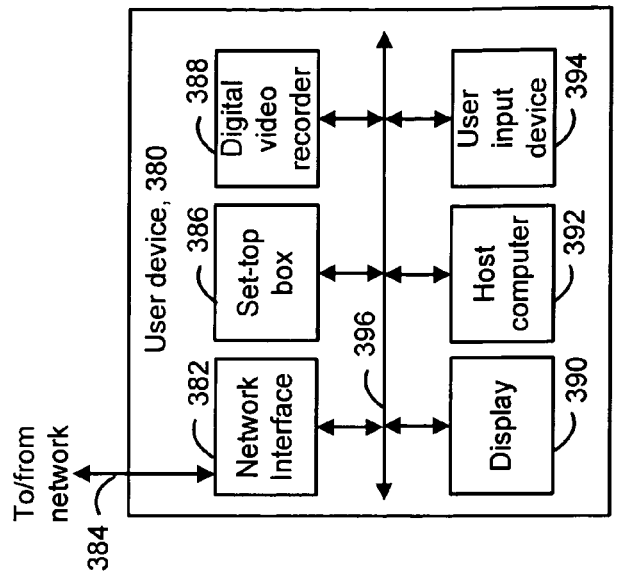
FIG. 3b depicts a user system for accessing an animation.
Figure 3A:
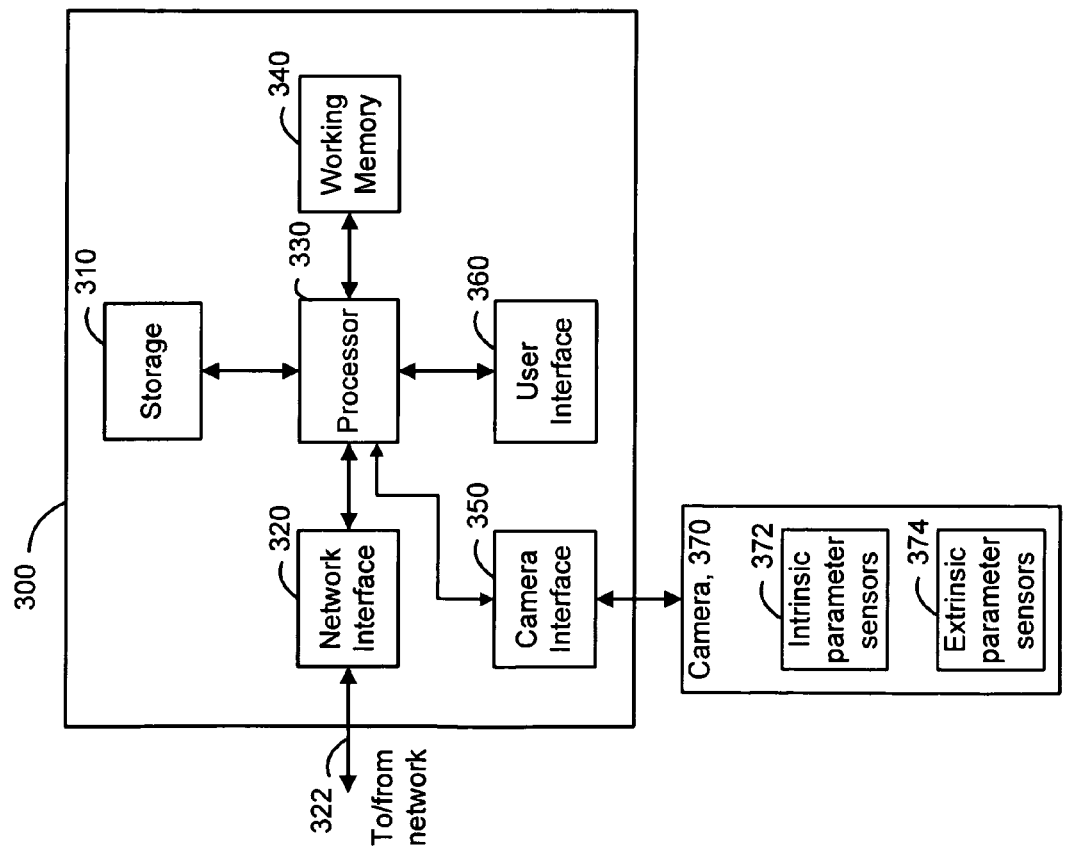
FIG. 3a depicts camera and processing facility components for processing images.

FIG. 3a depicts camera and processing facility components for processing images. The computer system 300 is a simplified representation of a system which might be used at the processing facility 110 (FIG. 1), for instance. The computer system 300 includes a storage device 310 such as a hard disk or portable media, a network interface 320 for communicating with other computer systems via a link 322, a processor 330 for executing software instructions, a working memory 340 such as RAM for storing the software instructions after they are loaded from the storage device 310, for instance, an example camera interface 350 (in practice, more than one may be used), and a user interface display 360.

The storage device 310 may be considered to be a processor readable storage device having processor readable code embodied thereon for programming the processor 330 to perform methods for providing the functionality discussed herein. The user interface display 360 can provide information to a human operator based on the data received from the camera via the interface 350. The user interface display 360 can use any known display scheme, whether graphical, tabular or the like. In addition to an on-screen display, an output such as a hard copy from printer can be provided to report results. Results can also be reported by storing data at the storage device 310 or other memory, e.g., for later use.

An example camera 370 includes extrinsic parameter sensors 372 and intrinsic parameter sensors 374. The extrinsic parameter sensors 372 can identify an orientation of the camera, such as a pan and tilt of the camera. The intrinsic parameter sensors 374 may identify a zoom setting, whether an extender is used and so forth. The camera 370 communicates image data, whether analog or digital, in addition to data from the extrinsic parameter sensors 372 and the intrinsic parameter sensors 374 to the computer system 300 via the camera interface 350. It is also possible to determine camera extrinsic and intrinsic parameters without sensors 372 or 374, as described above in reference to Tsai's method.

Further, the functionality described herein may be implemented using one or more processor readable storage devices having processor readable code embodied thereon for programming one or more processors to perform the processes described herein. The processor readable storage devices can include computer readable media such as volatile and non-volatile media, removable and non-removable media. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above are also included within the scope of computer readable media.

FIG. 3b depicts a user system for accessing an animation. In one aspect, a user such as a television viewer can access information for viewing an animation from a television broadcast or other data. In one approach, auxiliary information for providing the animation is provided with the television broadcast. In another approach, the auxiliary information is provided via another channel such as a computer network. Data for providing a user interface which allows the user to access, manipulate and/or create an animation can also be provided. The user system 380 can include a network interface 382 for receiving data from, and optionally communicating data to, one or more networks, such as a television broadcast network and/or a computer network. A set-top box 386, digital video recorder 388, display 390, host computer 392 and user input device 394, such as a handheld remote control, mouse or other pointing device, or keyboard, can also be provided. See also FIGS. 10a-d and the associated discussion.

FIG. 4 is a block diagram of one embodiment of a system which includes a conventional camera and a high resolution camera. For further details, see U.S. patent application Ser. No. 11/467,467, filed Aug. 25, 2006, titled "Video Effect Using Movement Within an Image", incorporated herein by reference. The use of a high resolution camera to provide virtual viewpoints can allow zooming in without getting blurry, compared to a standard resolution camera, since additional detail is captured. In one possible approach, a high resolution digital camera is co-located with a broadcast video camera, such as C1-C6 in FIG. 1. From this location the video/image/data will be transmitted to a production center 420, which can be in the processing facility 110, for instance, over fiber, coax or other transmission medium.

The system includes components at the camera location 410 and the production center 420. Camera location 410 can include a cameras being used to broadcast an event. It is contemplated that there can be multiple cameras broadcasting a live event and, thus, there will be multiple instances of the hardware components of camera location 410 in communication with production center 420.

Camera location 410 includes a digital still camera 430 and a broadcast video camera 432. Digital still camera 430 is in communication with camera interface 434. In some embodiments, digital still camera 430 is mounted on the lens (or otherwise attached to the camera) for broadcast video camera 432. In other embodiments, digital still camera 430 can be located near video camera 432. For example, digital camera 430 can be rigidly mounted, so that it is not able to pan or tilt, on a wall, platform, handrail, etc. very close to the broadcast video camera 432. One example of a suitable digital still camera is the Canon 1DsMKII. In one embodiment, each of the images captured by the digital still camera 430 comprises eight or sixteen megapixels. Broadcast camera 432 can be any suitable broadcast camera.

In other embodiments, instead of using a digital still camera, camera 430 can be a digital video camera which outputs video images at a fixed interval. In yet another embodiment, camera 430 can be another type of sensor that can provide electronic images to computer 440. In one example, camera 430 can be an analog broadcast camera and camera interface 434 can convert the analog video signals to digital video images or other types of electronic images.

In other embodiments, instead of using a digital still camera, camera 430 can be omitted and camera 432 can be a very high resolution camera connected to the camera interface 434 (as well as the connection to computer 440), which can have a large recording capability.

Furthermore, more than two cameras may be used. For example, one may wish to set two video cameras 180 degrees apart and several digital still cameras between to help create the virtual views between the video cameras. More than two video cameras can be used as well, which would give the operator a choice of which video to use for the leading and trailing video. Or, a single video camera can be used, with multiple still cameras placed to expand the effective range of the virtual views. Also, the digital still cameras may be used because of lower cost or easier setup instead of higher resolution.

Production center 420 includes a computer 440 with suitable processors, video card and Ethernet card. Broadcast video camera 432 sends its images to the video card (or other interface) on computer 440, e.g., at 30 or 60 frames per second. Computer 440 stores the received video as electronic digital video images. Each of the frames will be stored in a video buffer on a hard disk for computer 440. In one embodiment, the video buffer holds fifteen seconds of HD video or thirty seconds of SD video.

Computer 440 includes a monitor 442 and keyboard/mouse 444, all of which are used to implement the user interface. Camera 432 is connected to a monitor 460 which displays the video received from camera 432. Computer 440 is also connected to a monitor 462 for showing the output video. The output video is also provided to a video recorder 464. From the video recorder, the output video can be provided for broadcasting as part of the television production of the event being captured by broadcast video camera 432.

Camera interface 434 is used to control digital camera 430 and receive images from digital camera 430. Camera interface 430 sends the digital images to computer 440 via either a fiber data line 446 or a coaxial data line 448 or other transmission media. The fiber optic line from camera interface 434 is connected to a converter 450, which converts fiber data to Ethernet and provides the information to an Ethernet card for computer 440. Data sent on coaxial line 448 is sent through a filter (e.g., Humbucker filter) which filters out 60 cycle noise. The output of the filter is sent to a cable modem which provides the data to the Ethernet card for computer 440

A trigger switch 436 is connected to camera interface 434. An operator at production center 420 can push the trigger switch 436 in order to trigger camera 430 to take a picture. In one embodiment, the trigger switch can be located at the camera location 410. In another embodiment, instead of using trigger switch 436, the camera 430 will automatically take pictures at a set interval.

In another embodiment, an additional computer can be used at the production center 420 as a video server, receiving the video from camera 432 and storing all of the video for an event on a hard disk drive or other storage medium. This video server will synchronize its time with computer 440 via an Ethernet connection. Each frame (or field or other unit) of video stored will be provided with a time stamp by the video server. Similarly, computer 440 will add the offset between computer 440 and the video server to the data for the still images corresponding in time. When an animation is being created, as described below, computer 440 will access the necessary frame or frames of video from the video server.

Figure 5A:
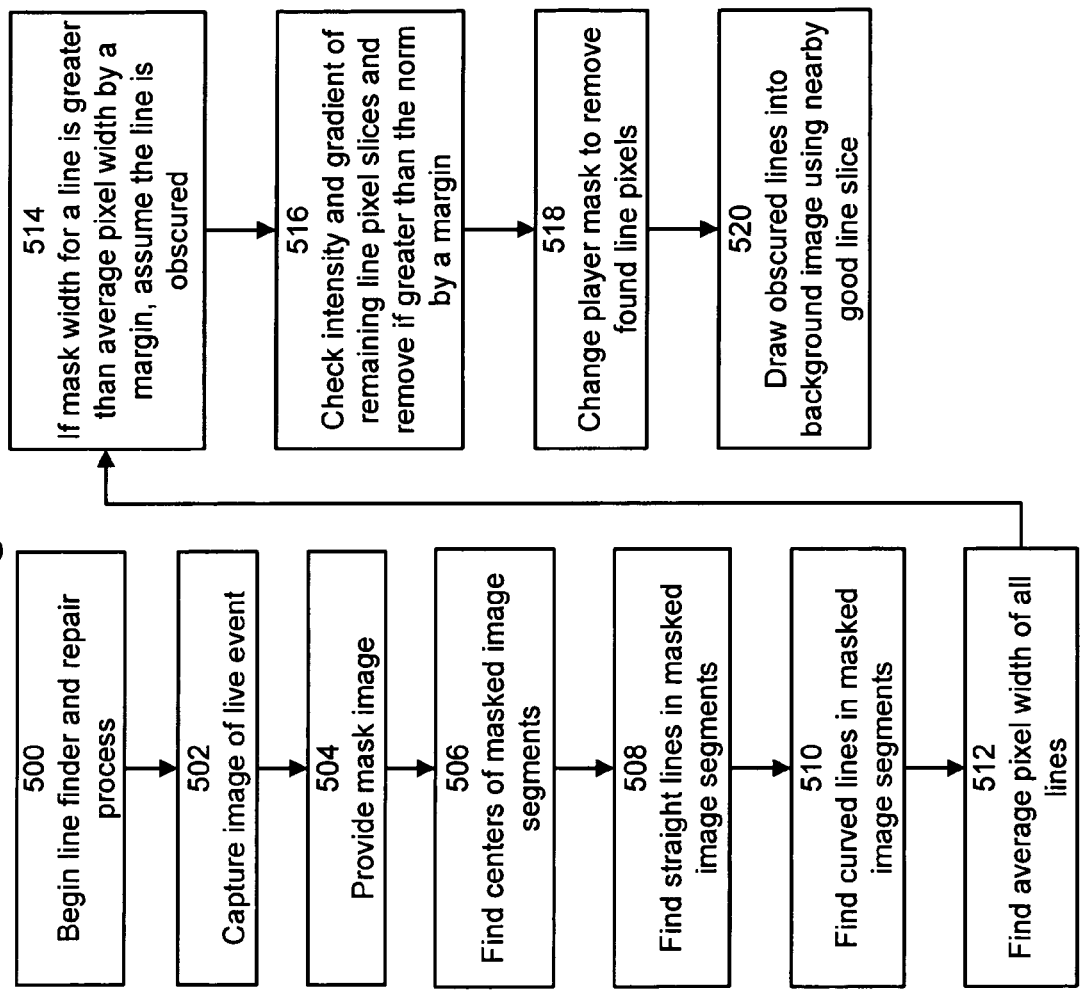
FIG. 5a depicts a line finder and repair process.

FIG. 5*a* depicts a line finder and repair process. Note that in this and other flowcharts the steps shown need not necessarily occur as discrete steps or in the order shown. To create an animation which depicts different virtual viewpoints of a live event, such as a sports event which is played on a field or other surface which includes markings such as boundary and field of play lines, it can be helpful to automatically detect and repair portions of the lines which may be occluded in a given image by players or other objects. Generally, such lines may appear as white chalk lines on a green grass field, black tape lines on a wood basketball court, and so forth. If the lines are not repaired, they may appear as artifacts in different virtual viewpoints, reducing the realism. For example, see also FIG. 5*d*, which depicts an image 550 in which a curved line, including portions 554 and 555, is partly occluded by a player 556, and a straight line including portions 552 and 553 is occluded by a player 558. Note that these and other figures are not necessarily to scale. For example, the lines may be thinner relative to the players.

Figure 5C:
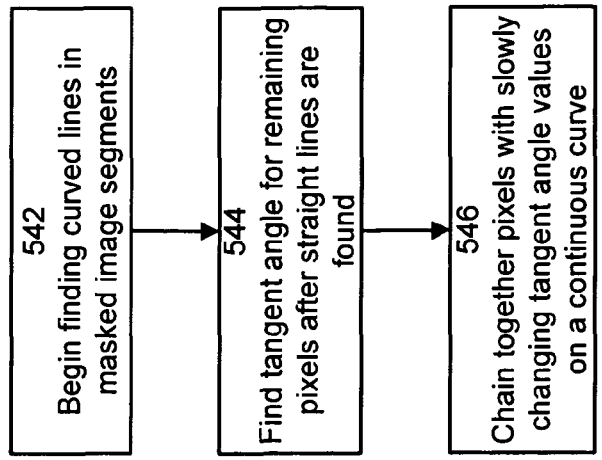

Step 500 of FIG. 5*a* begins the line finder and repair process. Step 502 includes capturing an image of a live event. Generally, this is an image for which it is desired to provide an animation with different virtual viewpoints of the event, such as an image showing the scoring of a goal in a soccer match or other key play. An operator can designate the specific image which is to be used from among the captured images, e.g., from the video of a conventional video camera or from an image provided by a special high resolution camera. Step 504 includes providing a mask image. For example, the mask image may be a black and white image in which the grass of the playing field is black and the lines are white. FIG. 5*d* depicts a mask image showing field lines and players in a sporting event. The penalty area of a soccer field is depicted. Here, for illustrative purposes, the grass area is also shown as white instead of black. Step 506 includes finding centers of the masked image segments, e.g., the field lines and players. Generally, the field lines and players have a thickness of more than one pixel. Vertical and horizontal scanning can be used to determine center points of the field lines and players or other objects. For example, intersections of points obtain by the vertical and horizontal scanning can yield the center points. FIG. 5*e* depicts an image 560 showing center points of masked image segments of the image of FIG. 5*d*. Each dot, such as dot 562, represents a center point. In practice, many more center points than those shown can be obtained.

Figure 5B:
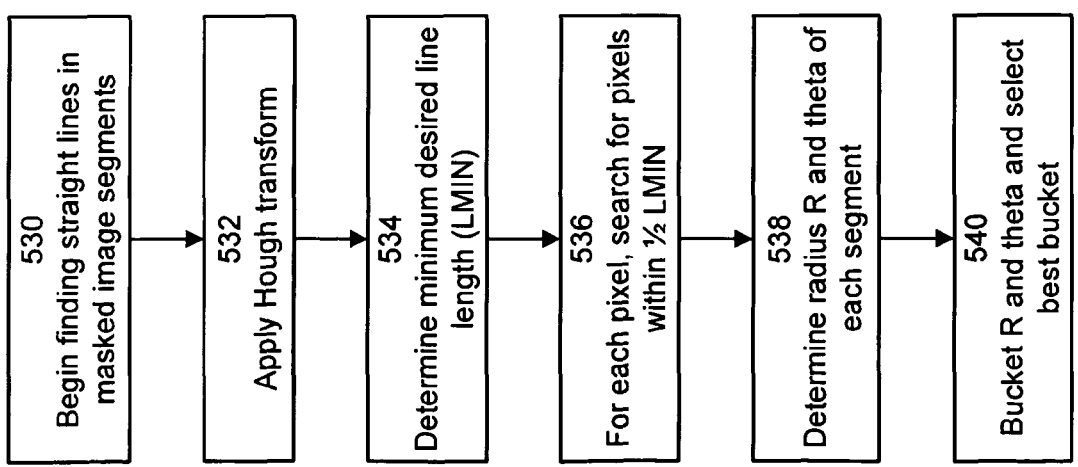
Figure 5D:
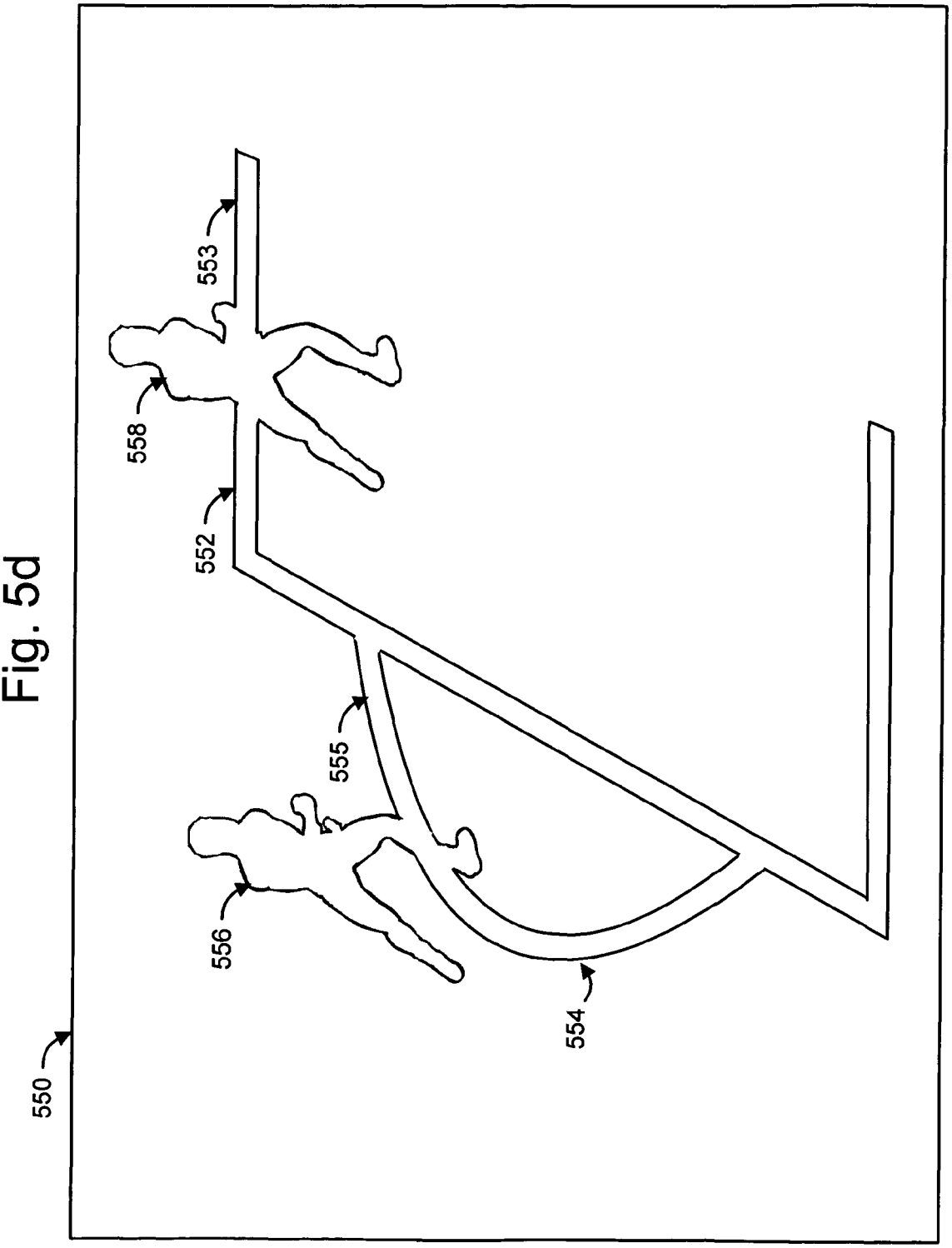
FIG. 5d depicts a mask image showing field lines and players in a sporting event.
Figure 5F:
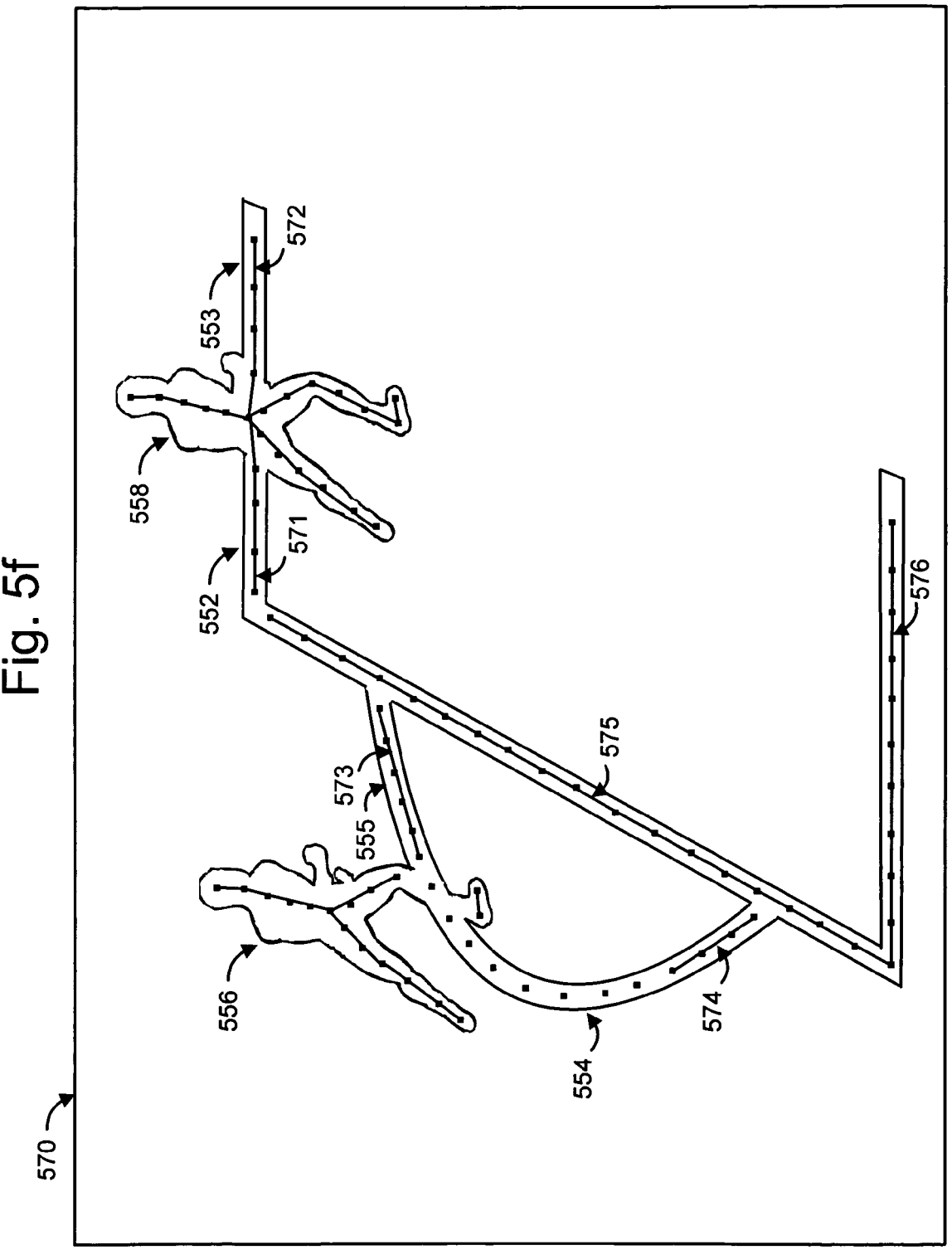
FIG. 5f depicts an image showing straight lines which connect center points of the image of FIG. 5e.

Step 508 includes finding straight lines in the masked image segments, as discussed further in connection with FIG. 5*b*. For example, FIG. 5*f* depicts an image 570 showing straight lines which connect center points of the image of FIG. 5*e*. For example, straight lines 571 and 572 are found in line portions 552 and 553, respectively. Straight lines 573, 574, 575 and 576 are also detected. Note that straight lines 573 and 574 appear generally as straight lines in the image from the viewpoint shown, although they would appear as curved lines from an overhead view.

Figure 5G:
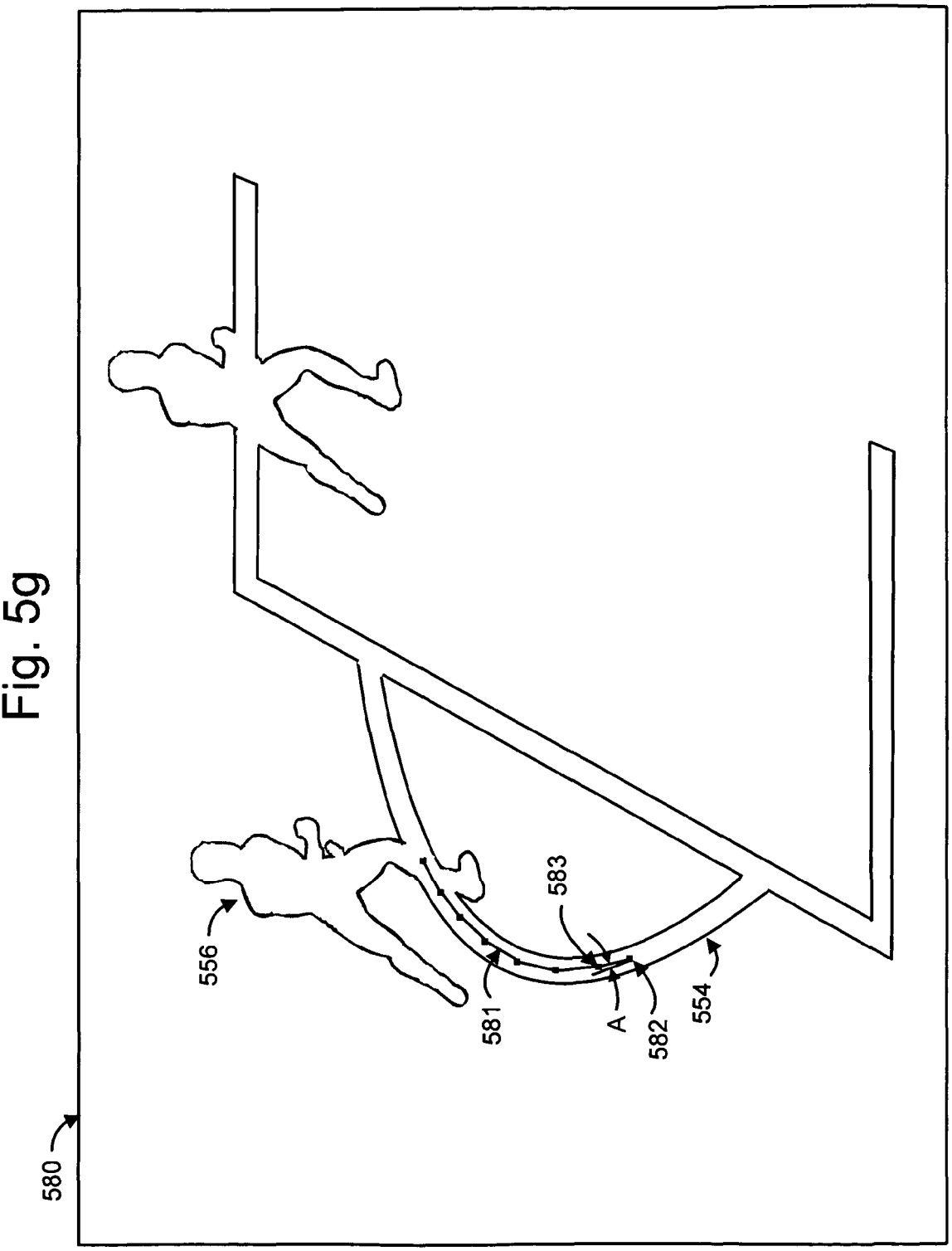
FIG. 5g depicts an image showing a curved line which connects center points of the image of FIG. 5e.

Step 510 includes finding curved lines in the masked image segments, as discussed further in connection with FIG. 5*c*. For example, FIG. 5*g* depicts an image 580 showing a curved line 581 which connects center points of the image of FIG. 5*e*, including example center points 582 and 583.

Step 512 includes finding an average pixel width of all lines, e.g., including curved and straight lines. The pixel width is taken in a direction which is perpendicular to the length of each line. Thus, each line can be traversed in increments and the pixel width taken for each increment. The pixel widths can then be summed and divided by the number of readings to obtain the average.

Step 514 includes determining if a mask width for a line is greater than the average pixel width by a margin, e.g., by 25%, in which case an assumption is made that the line is obscured. For example, FIG. 5*h* depicts an image 590 showing pixel widths along straight and curved lines of the image of FIG. 5*e*. As can be seen, the pixel widths of line portions 552 and 553 are about the same, while the pixel width in the region of the player 558 is much greater. As a result, it can be determined that the line which includes the portions 552 and 553 is occluded by the player 558. Similar processing can determine that a curve which includes the portions 554 and 555 is occluded by the player 556.

Step 516 includes checking intensity and gradient values of the remaining line pixel slices and removing them if greater than the norm by a margin. The intensity and gradient values may be from the Hough transform which can be used in step 508 and 510.

Step 518 includes changing the player mask to remove the found line pixels. For example, FIG. 5*i* depicts an image 592 showing removal of an object (e.g., player 558) which occludes a straight line of the image of FIG. 5*h*. Removal of the player creates a gap 593 between the straight line portions 552 and 553.

Step 520 includes drawing obscured lines into the background image using a nearby good line slice. For example, FIG. 5*j* depicts an image 595 showing removal of objects which occlude straight and curved lines of the image of FIG. 5*h*, and repair of the lines. Here, repaired line portions 597 and 596 are depicted. Straight line portion 596 can be provided by filling in pixel data between the straight line portions 552 and 553, while curved line portion 597 can be provided by filling in pixel data between the curved line portions 554 and 555. The resulting image 595 which is obtained advantageously includes the line portions which were previously obscured. The resulting image 595 can be used in creating a more realistic animation when the image is viewed from different virtual viewpoints.

The resulting image data can be, e.g., stored in memory, output to another device for further processing, and/or communicated to another location. Further, note that it may only be desired to remove the lines without repairing them. In this case, step 520 can be omitted. Further, image data both with and without the lines can be obtained.

Thus, a method for automatically finding and repairing lines in image data of an event is provided. Advantageously, line segments in the mask image can be automatically detected, the portion of a line segment which is occluded by the object (e.g., a player) can be automatically determined and the object can be automatically removed.

FIG. 5*b* depicts a process for finding straight lines in the line finder and repair process of FIG. 5*a*. The process provides details regarding step 508 of FIG. 5*a*. A process for finding straight lines in masked image segments begins at step 530. In one possible implementation, step 532 includes applying the Hough transform to the center pixels of the masked image segments. The Hough transform is a feature extraction technique used in digital image processing. The classical transform identifies lines in the image, and has been extended to identifying positions of arbitrary shapes. The Hough transform can be used to detect a group of pixels that are on a straight line or a smooth curve. See, e.g., U.S. Pat. No. 3,069,654 to Hough, issued Dec. 18, 1962, incorporated herein by reference. The Hough transform parameterizes lines with two parameters, commonly called R and θ (theta). The parameter R (radius) represents the distance between the line and the origin, while θ is the angle of the vector from the origin to a point. The algorithm can use an array called an accumulator to detect the existence of a line in the original image space. For each pixel and its neighborhood, the Hough transform determines if there is enough evidence of an edge at that pixel. If so, it will calculate the parameters (e.g., R and θ) of that line, and then look for the accumulator's bin or bucket that the parameters fall into, and increase the value of that bucket. By finding the buckets with the highest value, the most likely lines can be extracted, and their (approximate) geometric definitions obtained. Note that the slope intercept Hough transform (y=mx+b) may be used in some situations, but it fails for vertical lines, in which case R and θ are used.

Step 534 includes determining a minimum desired line length (LMIN), e.g., in units of pixels. Lines with a smaller length are not detected. Step 536 includes, for each pixel, searching for pixels within a specified distance, such as ½ LMIN. Step 538 includes determining the radius R and the angle theta (θ) for each segment. Step 540 includes bucketing R and theta, and selecting the best bucket. In this manner, a straight line in a mask image can be detected.

FIG. 5c depicts a process for finding curved lines in the line finder and repair process of FIG. 5a. The process provides details regarding step 510 of FIG. 5a. As with the straight line detection process of FIG. 5b, the Hough transform may be used, in one possible implementation, to detect curved lines in a masked image. A process for finding curved lines in masked image segments begins at step 542. Step 544 includes finding a tangent angle for remaining pixels after straight lines are found. For example, referring to FIG. 5g, a tangent angle "A" is depicted for a pixel represented by a point 582. A tangent angle can be determined for the pixel represented by a point 583, and so on. Step 546 includes chaining together pixels with slowly changing tangent angle values. For example, an appropriate threshold angle can be determined according to the sports event at issue, camera registration settings and other factors, so that curves which change at a rate which is above the threshold are discarded, while curves which change at a rate which is below the threshold are not discarded, but are processed and repaired if necessary in the line finder process of FIG. 5a.

Figure 6A:
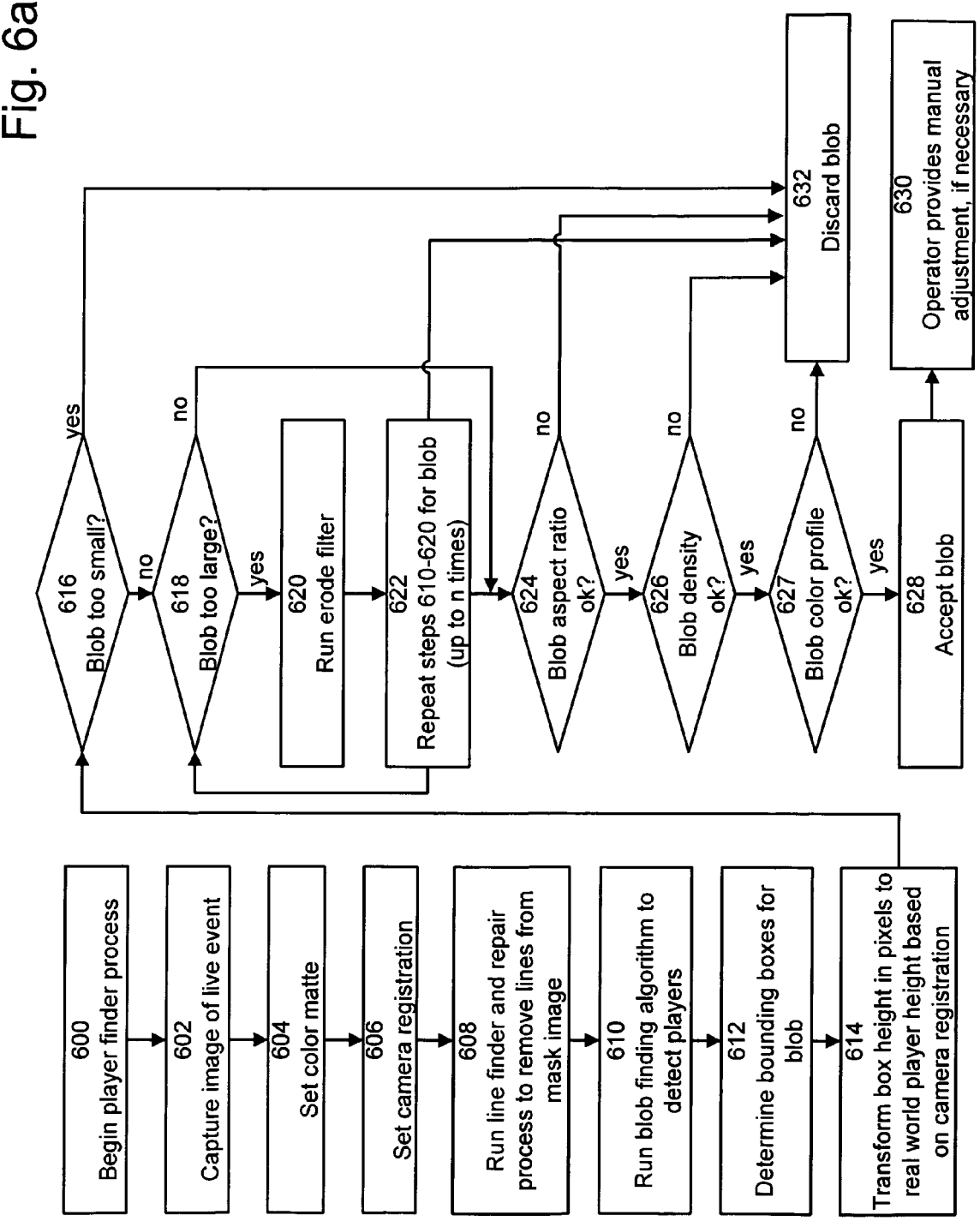
FIG. 6a depicts a player finder process.

FIG. 6a depicts a player finder process. Generally, this process can be used to detect objects in an image, where the objects have particular characteristics, e.g., size, shape, aspect ratio, density and color profile. In one approach, the players are extracted from an image using an operator assisted color mask method after the field lines have been removed. This approach can provide benefits compared to a difference method, for instance, in which the moving components of a frame are detected. However, the difference method or other techniques may alternatively be used.

Figure 6B:
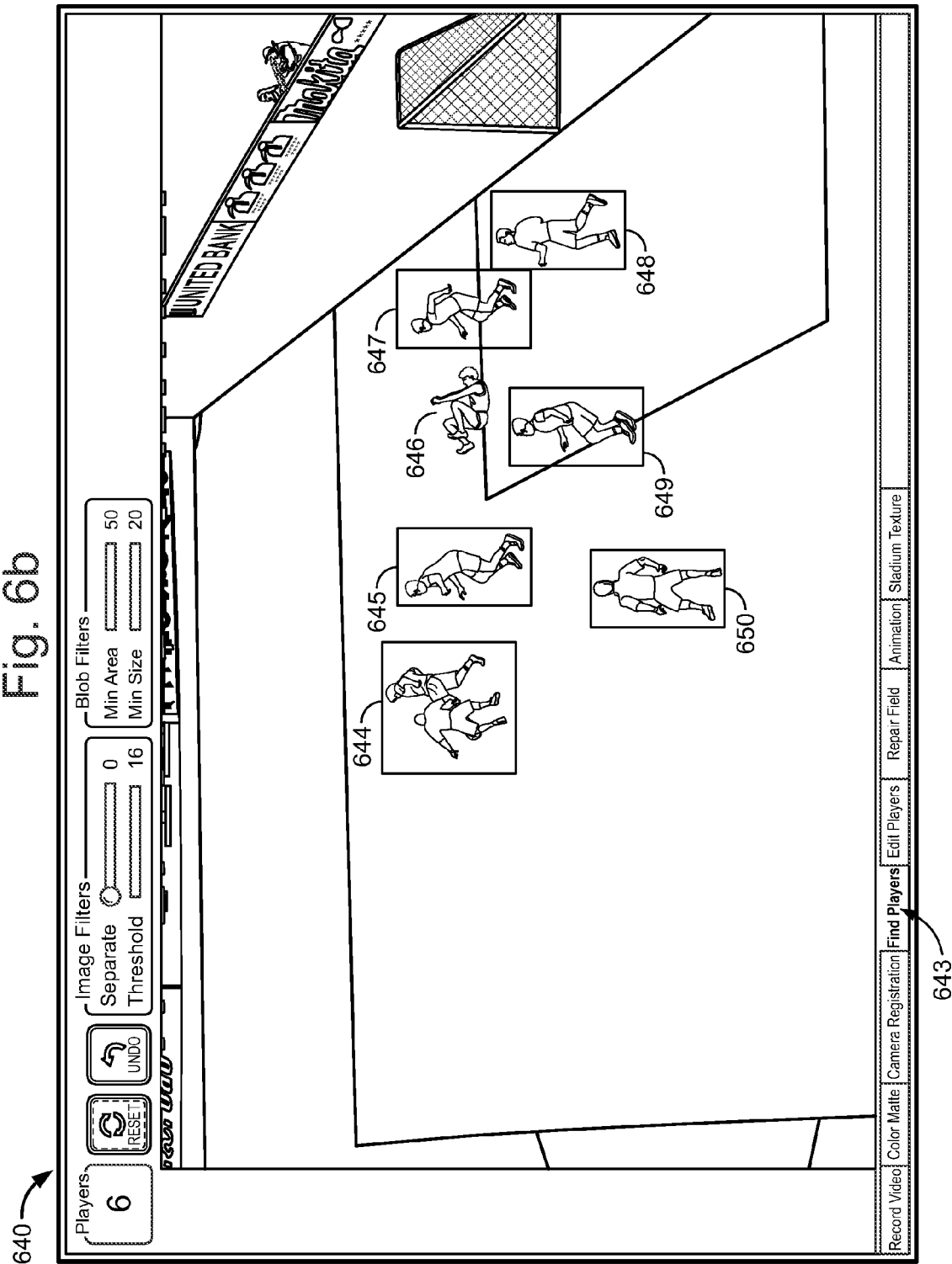
Figure 6C:
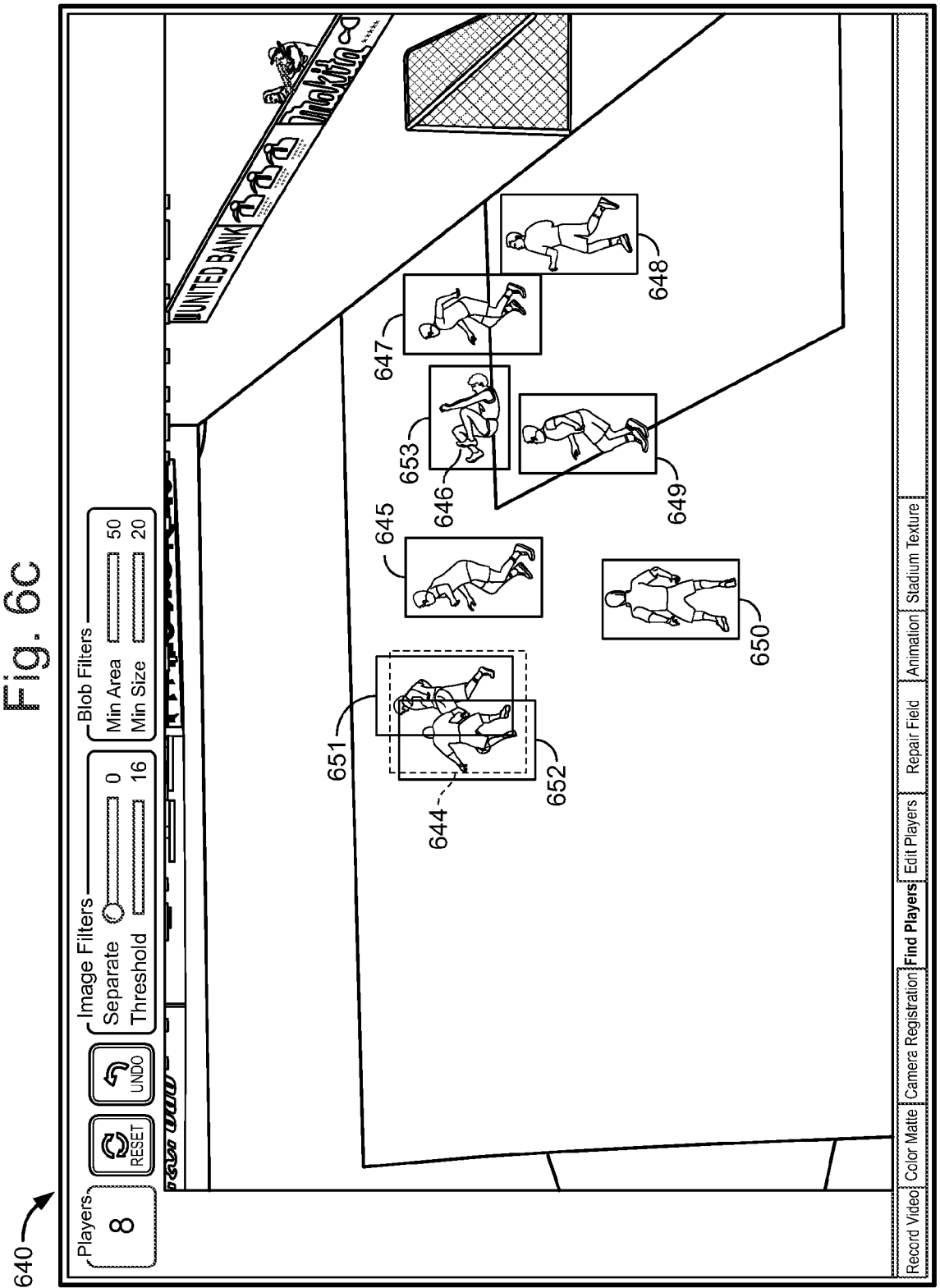
Figure 6D:
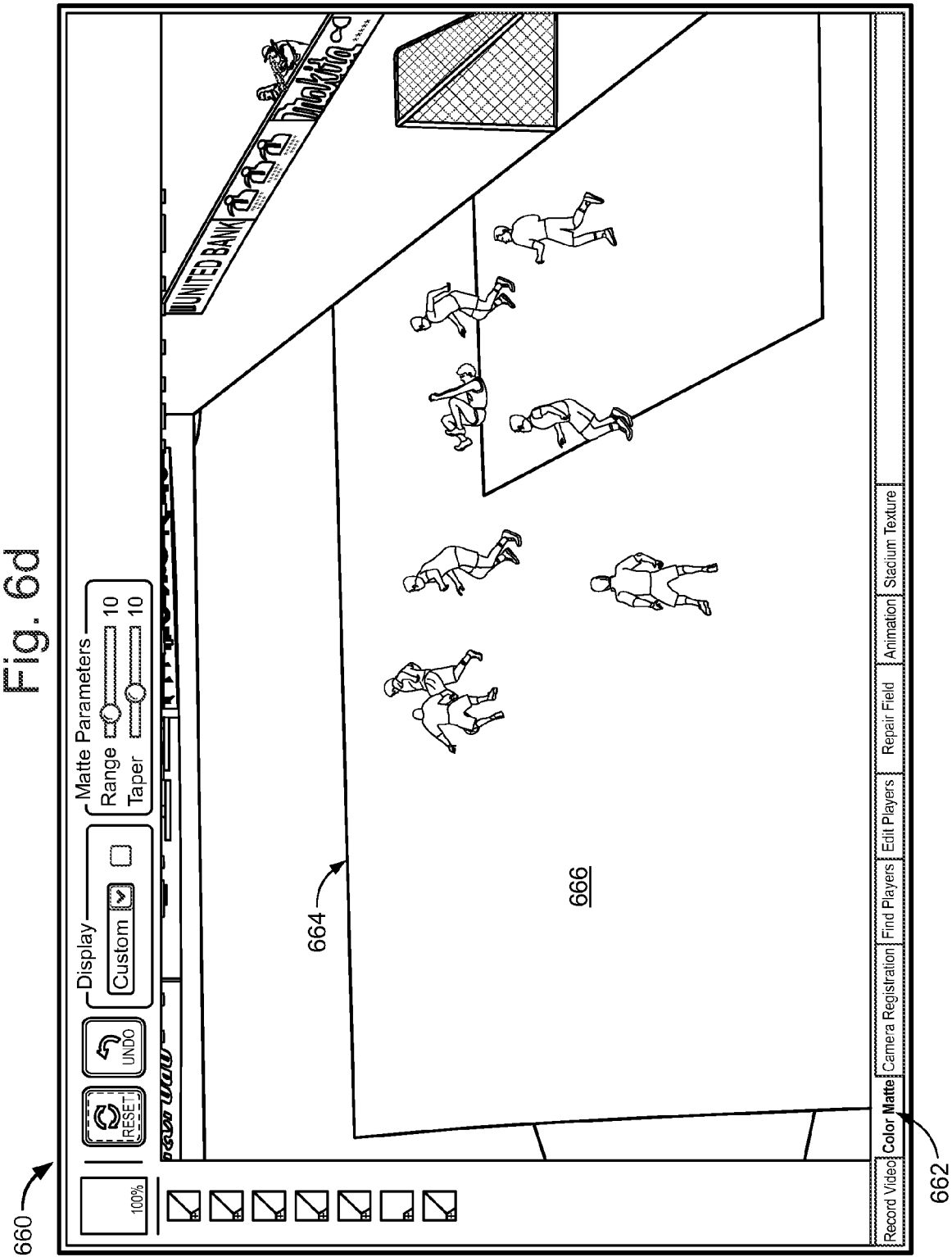
FIG. 6d depicts a color matte image of the video image of FIG. 6b.

In an example implementation, players in a sports event are detected. The player finder process begins at step 600. Step 602 includes capturing an image of a live event. For example, FIG. 6b depicts a video image 640 which is provided in a user interface seen by an operator. The user interface includes a set of tabs. Each tab can be selected by the operator to perform a different function. The currently selected tab 643 is entitled "Find Players." Step 604 includes setting a color matte. For example, FIG. 6d depicts a color matte image 660 of the video image of FIG. 6b. The image includes the field lines 664 and a field 666. The field lines 664, which are white in the original image, are depicted as being dark. Similarly, the field 666, which is a dark green in the original image, is depicted as being light. The currently selected tab 662 is entitled "Color Matte." A color matter image is usually black and white. What is shown in FIG. 6d is an overlay where the areas that would normally be black in the color matte are drawn in yellow over the original image. The yellow appears as a lighter color. The color of the lines in the image was not changed. The lines just appear dark next to the yellow.

Figure 6E:
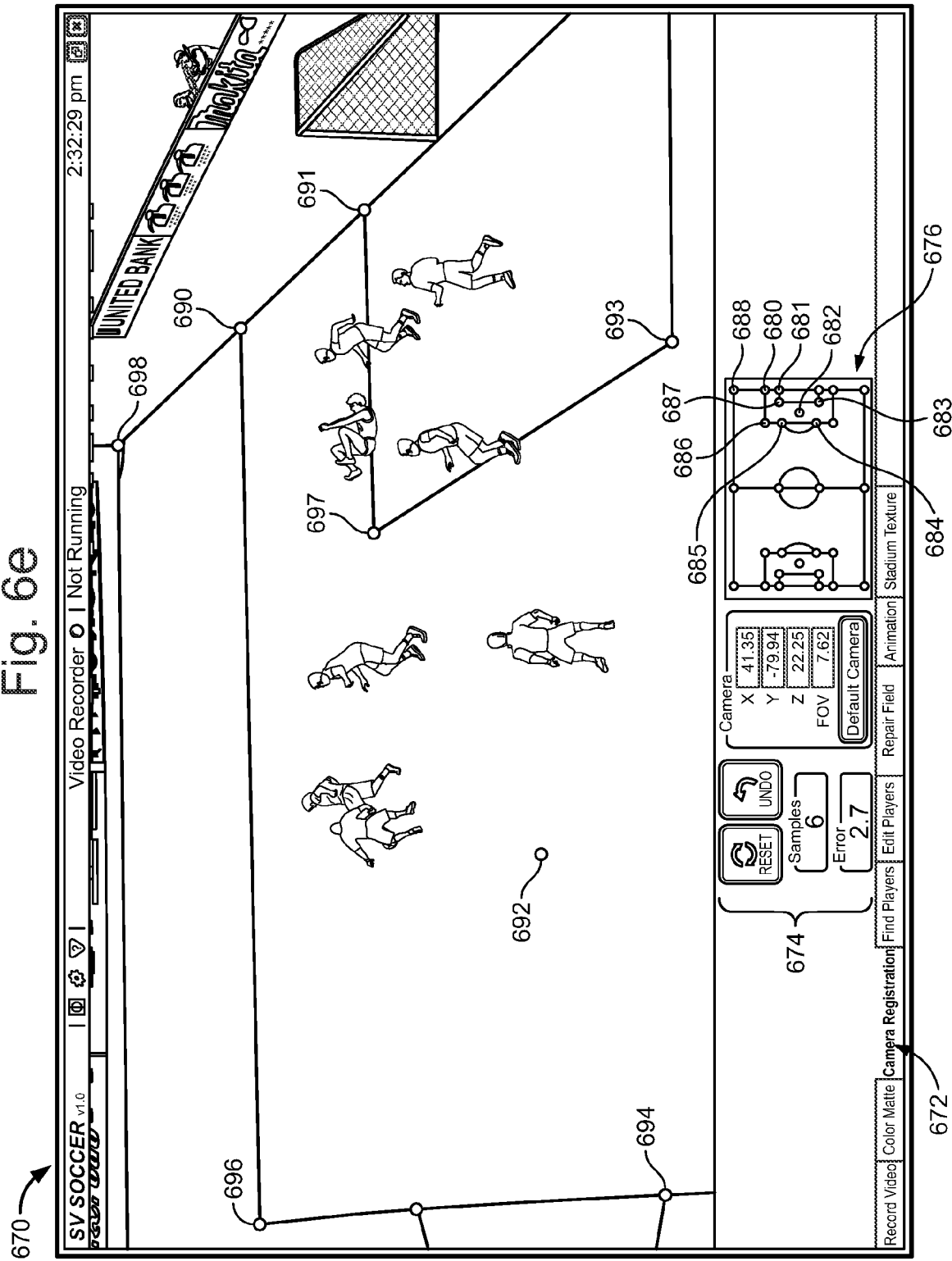
FIG. 6e depicts a user interface which includes the video image of FIG. 6b and a camera registration schematic.

Step 606 includes setting a camera registration. For example, FIG. 6e depicts a user interface 670 which includes the video image of FIG. 6b and a camera registration schematic 674. The camera registration schematic 674 depicts x, y, and z coordinates, as well as a field of view value, for a camera which provided the image. Further, a diagram of the playing field 676 includes registration points 680-688. The operator can use a mouse or other pointing device to select one of the points in the diagram 676 and then select a corresponding point in the image. For example, points 680-688 in the diagram 676 correspond to points 690-698, respectively, in the video image. In practice, selecting a few points is usually sufficient to register the camera. When the camera is registered, a transformation matrix is defined for converting from a location in pixel space to a location in world coordinates or other coordinate system. The reverse transformation can also be performed, e.g., world coordinates to pixel space/screen pixels. Moreover, note that it is helpful to perform camera registration for a specific image which is used to provide an animation at different virtual viewpoints. Another approach is to perform calibration on an initial image and use that calibration for a subsequent image which is used to provide the animation.

Step 608 includes running a line finder and repair process, discussed further in connection with FIG. 5a, to remove lines from a mask image and/or to repair occluded portions of lines. For example, it may only be desired to remove the lines without repairing them before finding the blobs. In this case, step 520 of FIG. 5a can be omitted. Step 610 includes running a blob finding algorithm to detect players in the image. A blob finding algorithm refers to any algorithm which can detect an object in an image, where the object has specified characteristics. In one example implementation, the cvBlobsLib source code, available from Intel's Open Source Computer Vision Library, can be used. Step 612 includes determining a bounding box for each blob, e.g., according to the height and width of each blob. For example, FIG. 6b depicts bounding boxes 644, 645 and 647-650. Step 614 includes transforming the box height in pixels to a real world player height based on the camera registration. For example, a certain pixel height in image space will correspond to a certain player height in feet. The height varies depending on where the player is in the image. An average player height can be used. Note that a player can be detected from a single frame without the need to track players across multiple video frames.

At decision step 616, if the blob is too small, e.g., its height is less than the average height of a player by a threshold amount, e.g., 25%, the blob is discarded at step 632. At decision step 618, if the blob is too large, e.g., its height is greater than the average height of a player by a threshold amount, e.g., 25%, an erode filter is run on the blob at step 620. An erode filter tends to reduce the size of the blob so that smaller features are removed, leaving one or more central masses. This can be useful, e.g., when two players which are connected by a field line are initially identified as one blob. The erode filter will tend to remove the line while leaving the main portions of the players so that they can be re-identified as separate players by the blob finding algorithm. Other times, a logo on the field may be mis-identified as a player.

Step 622 indicates that steps 610-620 can be repeated up to a specified number (n) of times. If the blob is still too large, it is discarded at step 632.

If the blob is not too small or large, that is, it is within the size range which is expected for the object which is being detected, e.g., a player, a decision is made at step 624 as to whether the blob aspect ratio (e.g., height to width ratio of the blob bounding box) is within specified tolerances. For example, an average aspect ratio may be ascertained through previous studies. If the aspect ratio is within, e.g., +/−25% of the average aspect ratio, a further check is performed. Note that an aspect ratio of a player may be out of limits if the player is on the ground, for instance (e.g., player 646 is on the ground). In such a case, the operator can manually select the player via the user interface of FIG. 6b. A density check is performed at decision step 626. The density of a blob can indicate what portion of a bounding box is taken up by the blob, e.g., the identified object, e.g., as a ratio of white pixels to total bounding box size. For example, a blob detecting algorithm might initially detect that a field line which has a height similar to a player is a player. A density check would identify this error since a white field line against a background of the green field would have a low density which is not within, e.g., +/−25% of the expected range. If the aspect ratio or density is not acceptable, the blob is discarded at step 632.

At step 627, a color profile of the blob is checked. Generally, the player finder process, or any analogous object finding process, can use color profiles to assist in detecting and distinguishing players or other objects. In one approach, a color profile or signature involves a distribution of color data of an image of an object across a color space palette. The color profile can be expressed by a histogram, where each vertical bar indicates, by its height, a number of pixels which have been classified into a particular bin or range of colors in a color space. Most color spaces include multiple components. For example, a 24-bit implementation of the RGB color space includes 8-bits (256 levels, labeled from 0-255) each for red, green and blue components. A color profile can include bins which each encompass a range of color components. In one possible approach, each detected blob can be further processed by obtaining its color profile and comparing the color profile to an expected color profile. If the detected color profile falls within an expected range of color profiles, the detected blob may be deemed to be a detected player, for instance. Further, the expected color profile can be set for different teams in a sport event, for instance, based on their uniform colors. If the color profile is acceptable, the blob is accepted at step 628 as accurately identifying a player or other object of interest. Otherwise, the blob is discarded at step 632.

At step 630, the operator can provide manual adjustments, if necessary. For example, the bounding box 644 (FIG. 6b) has misidentified two players as being one player since they are overlapping. In this case, the operator can remove the current bounding box 644 and use a pointing device to draw new bounding boxes 651 and 652 around each player, as indicated in FIG. 6c. FIG. 6c depicts a video image after an operator has separated out two players from a common bounding box which was provided by the process of FIG. 6a. The operator has also manually added a bounding box 653 for player 646.

Note that in this and other examples, the objects need not be players in a sporting event. The objects can be other participants in a sporting event, such as referees. Further, non-human objects may participate in a sporting event, either with or without humans, such as a horse in a polo contest or horse race. Also, a sporting event can be indoors or outdoors. Further, the event need not be a sporting event but can be any type of event in which physical movement of objects is of interest. As another example, an event can be analyzed for security purposes, accident reconstruction purposes and so forth.

Figure 7A:
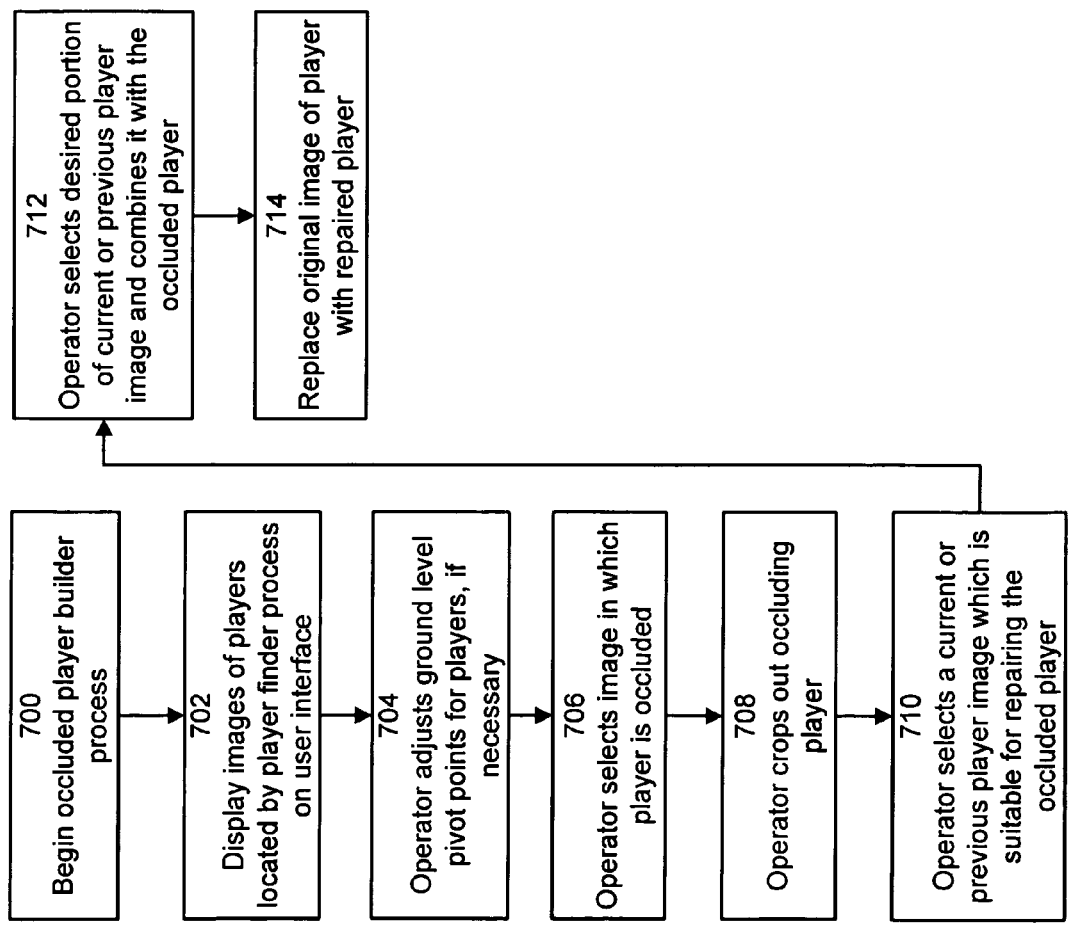
FIG. 7a depicts a process for building a missing portion of an occluded player.

FIG. 7a depicts a process for building a missing portion of an occluded player. As mentioned, objects of interest such as players in a sports event may sometimes occlude one another in the action of the game. In such cases, the realism of an image which is rendered from different virtual viewpoints can be enhanced by rebuilding an image of a player to add in any missing features, such as arms or legs or other body parts. For example, in the image 640 of FIG. 6c, the player in bounding box 651 is occluded partly by the player in bounding box 644.

Figure 7B:
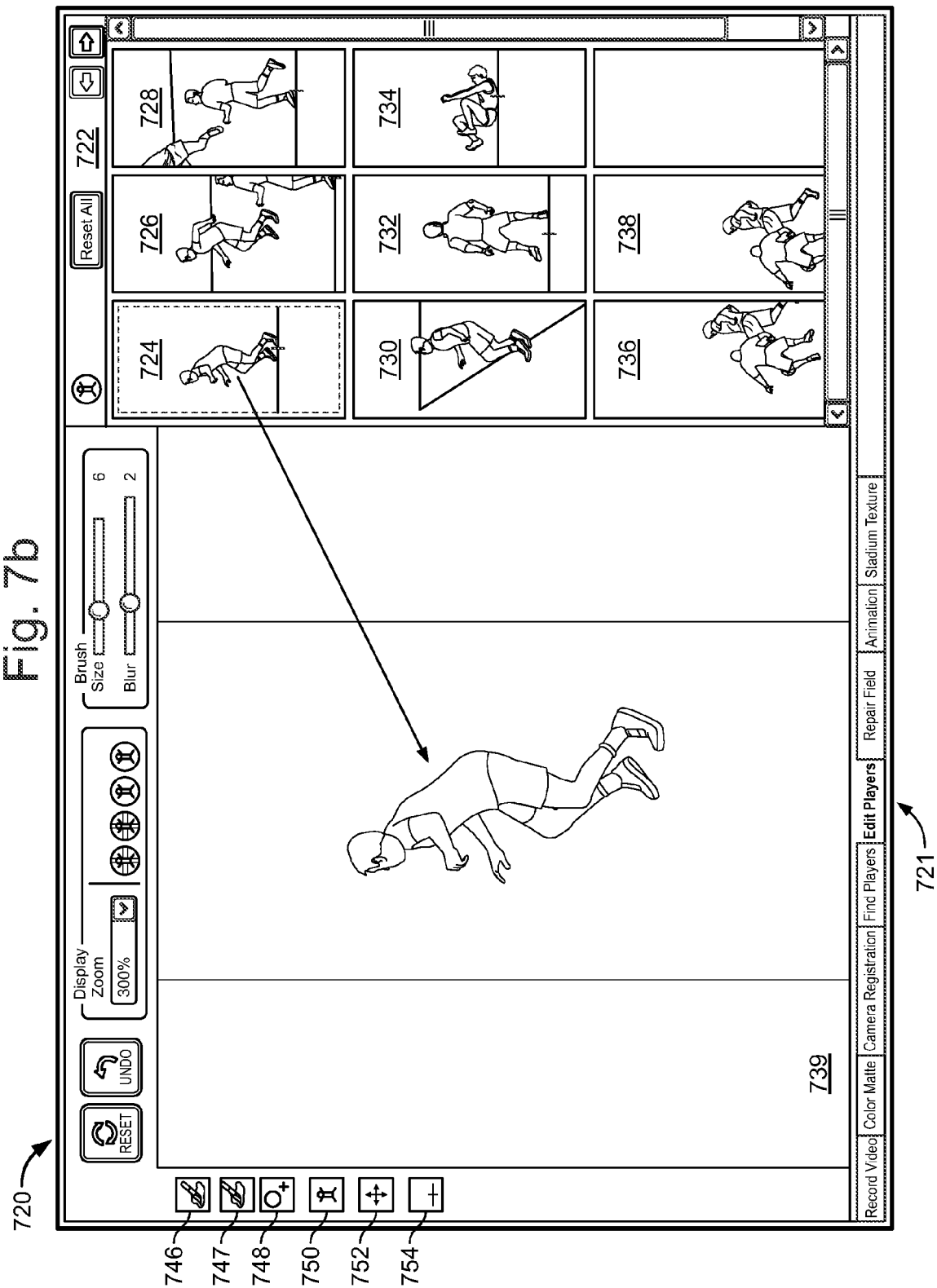
FIG. 7b depicts a user interface for building a missing portion of an occluded player.

The occluded player builder process begins at step 700. Step 702 includes displaying images of players located by the player finder process of FIG. 6a on a user interface. For example, FIG. 7b depicts a user interface 720 for substituting a missing portion of an occluded player. The interface is displayed when an "Edit Players" tab 721 is selected by the operator. In a display region 722, images 724, 726, 728, 730, 732, 734, 736 and 738 are displayed, one for each player which is located by the player finder process. The player images correspond to those in FIG. 6c. Some images, such as images 726, 728, 736 and 738 depict more than one player, although a different player is in the center of each image. For example, images 726 and 728 include the same two players, and images 736 and 738 include the same two players. The operator can configure the size of each player image. The operator can use tools, such as cropping and paint brush tools, to remove an extraneous player as well as any extraneous images such as field lines, such as shown in images 726, 728 and 730. Image 724 is currently selected, and is shown in detail in a display region 739. The user interface 720 includes other tools such as paintbrushes 746 and 747 for painting in portions of the player in the display region 739, cut and paste tool 748, library select button 750 for accessing a library of images, up/down positioning tool 752 for moving images in the display region 739, and ground level and pivot point tool 754 for setting a ground level and pivot point of a player.

Step 704 (FIG. 7a) includes the operator adjusting the ground level and pivot point for an image if necessary. For example, for the player 728, the ground level is represented by a horizontal line 756 and a pivot point, which defines a pivot/rotation axis, is represented by a smaller vertical line 758. The ground level and pivot point are both configurable by the operator, such as by dragging the lines using a pointing device. In one approach, an automatic algorithm may be used to identify the ground level as being at the bottom of the player image, while the pivot point is set automatically at a midpoint of the player's width. This is suitable for rendering an animation of the players at different virtual viewpoints in most cases. However, in some cases, the player may be jumping in the air, for instance, in which case, the ground level should be below the player's image in order for the image to be more realistic when viewed from different virtual viewpoints. The operator can set the ground level and/or pivot point accordingly by referring to the original image if necessary.

Figure 7C:
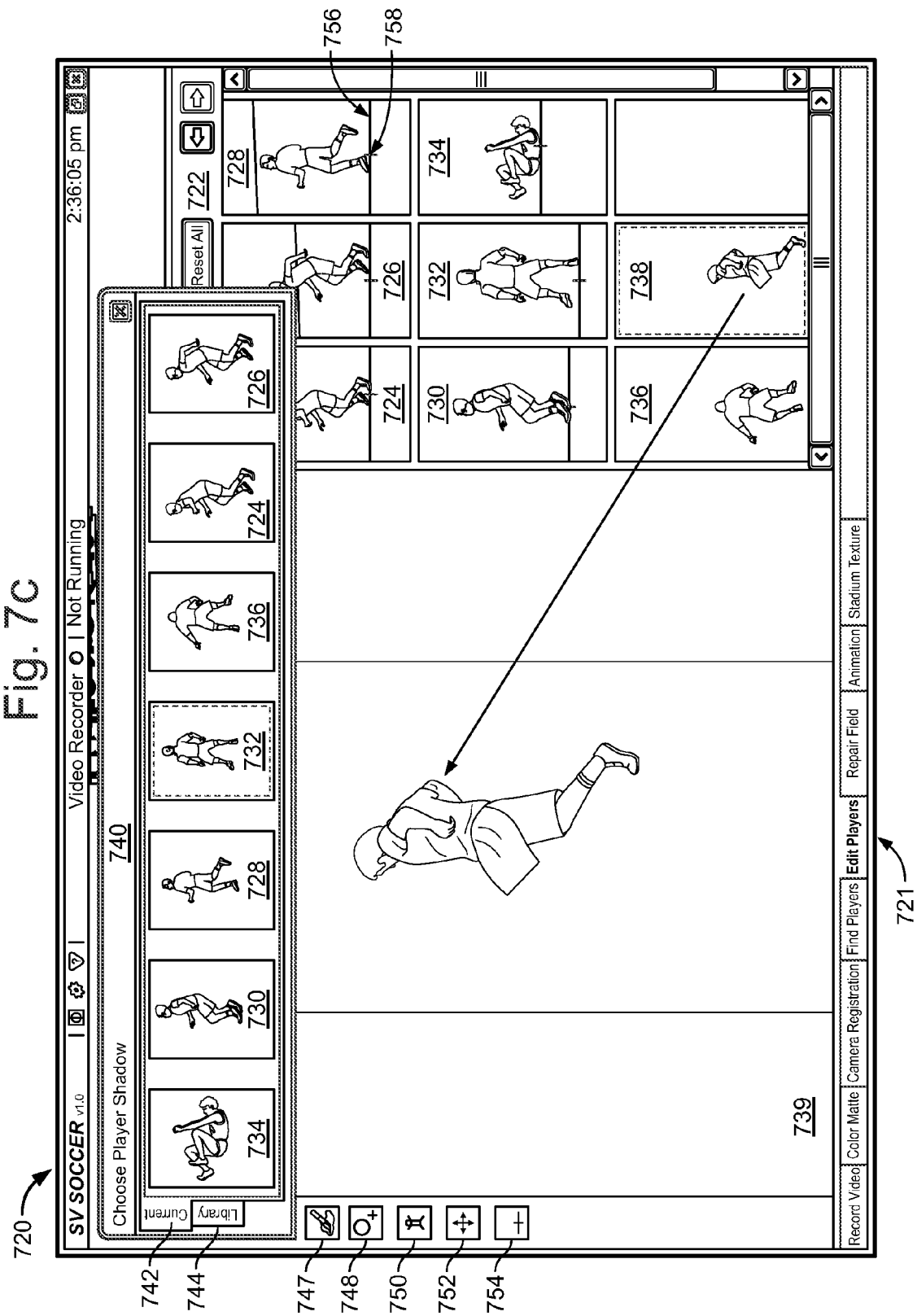
FIG. 7c depicts a user interface showing a player with a missing portion and a library of images for providing the missing portion.

Step 706 includes the operator selecting an image in which a player is occluded. In the example of FIG. 7c, this is image 738. Step 708 includes the operator cropping out the occluded player. When the operator uses the interface tools to crop out the overlapping player, the remaining player will appear with no leg, as indicated in FIG. 7c. FIG. 7c depicts the user interface 720 showing a player with a missing portion, e.g., leg. The player from image 738 is selected and therefore appears in the display region 739. Further, the operator has selected the library icon 750 so that a library 740 of images for providing the missing portion is displayed. The library 740 provides images which the operator can use in repairing the occluded player. A tab 774, "Library", can be selected by the operator to access prior images of the players, e.g., typically from the same sporting event, or from prior sporting events. A tab 742, "Current", which is currently selected, can be selected by the operator to access images of the players from the current frame. The players 734, 730, 728, 732, 736, 724 and 726 are the same as the like-numbered images in the display region 722.

Figure 7E:
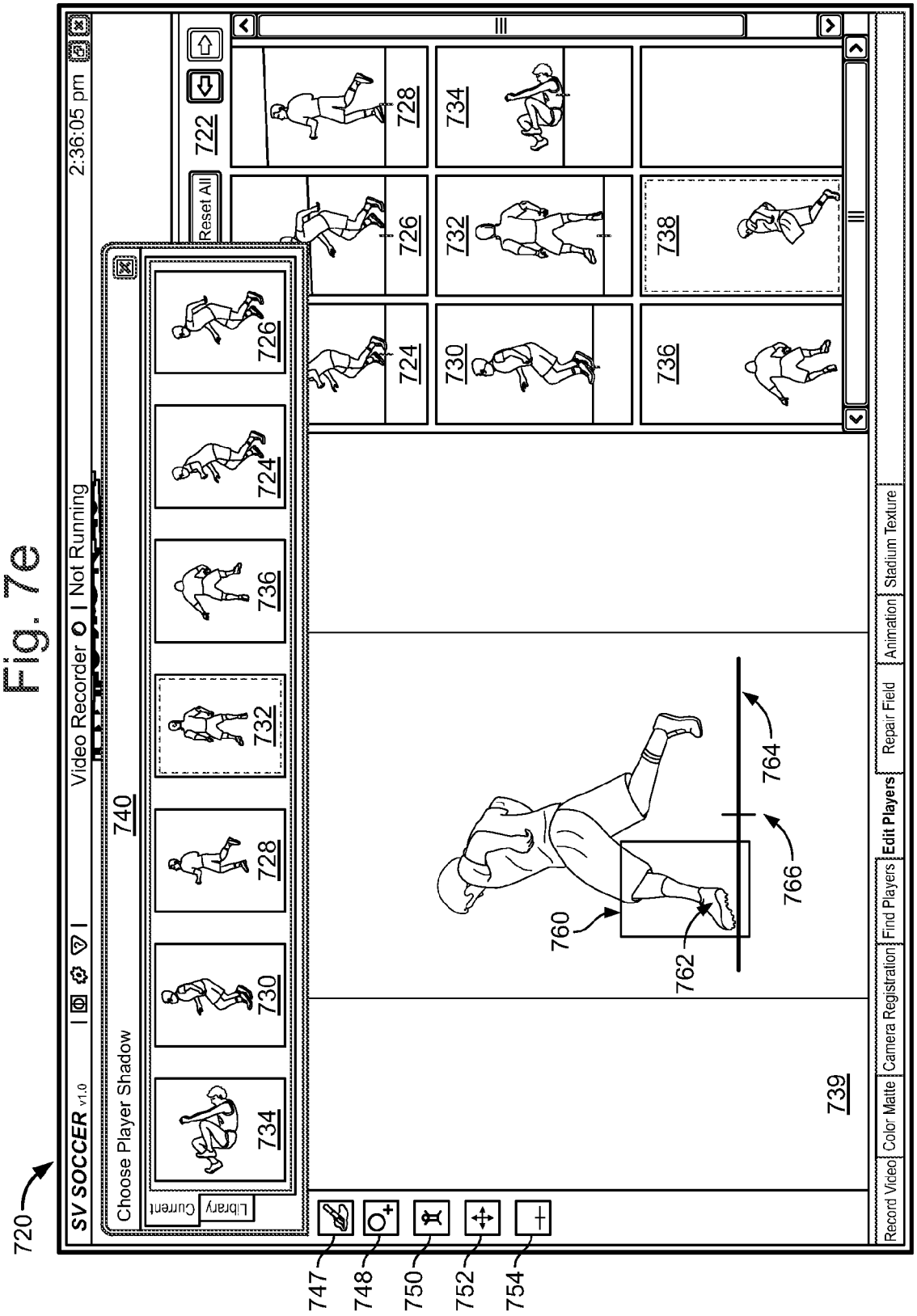
FIG. 7e depicts the user interface of FIG. 7d after repairing the player with the missing portion.

Step 710 includes the operator selecting a current or previous player image which is suitable for repairing the occluded player. Here, image 732 of the library 740 is selected by the operator, as indicated by the dashed lines. Through use of judgment, the operator believes that the leg of the player 732 can be combined with the player image in the display region 739. When the image 732 is selected, the image is moved to the display region 739. FIG. 7d depicts the user interface of FIG. 7c showing the selected library image 732 combined with the player with the missing portion. The operator can use tools to scale and position the image 732 so that its leg is in a desired position, and has a desired size, relative to the occluded player. Step 712 includes the operator selecting a desired portion of the current or previous player image and combining it with the occluded player. FIG. 7e depicts the user interface of FIG. 7d after repairing the player with the missing portion. A box 760 indicates a portion of the library image 732 which was cut and combined with the occluded player. Additionally, the operator painted in a foot portion 762 of the occluded player, in addition to providing a ground level 764 and a pivot point 766 for the occluded player. A portion of the cropped out portion of the library image 732 appears behind the occluded player so that an upper portion of the occluded player's leg is visible and appears to transition naturally into the added in leg.

Step 714 includes replacing the original image of the occluded player with the repaired player. Once the repaired player has been built, the operator saves the image and it is used in place of the original occluded image in texturing a model of the player when rendering different virtual viewpoints. Again, this procedure adds realism to the virtual viewpoints.

Figure 8B:
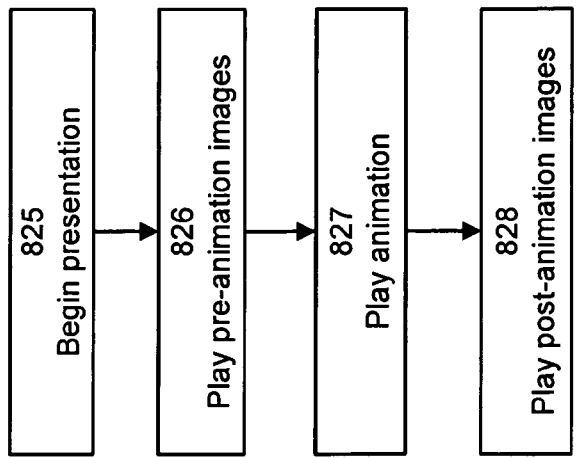
FIG. 8b depicts a process for providing a presentation.
Figure 8A:
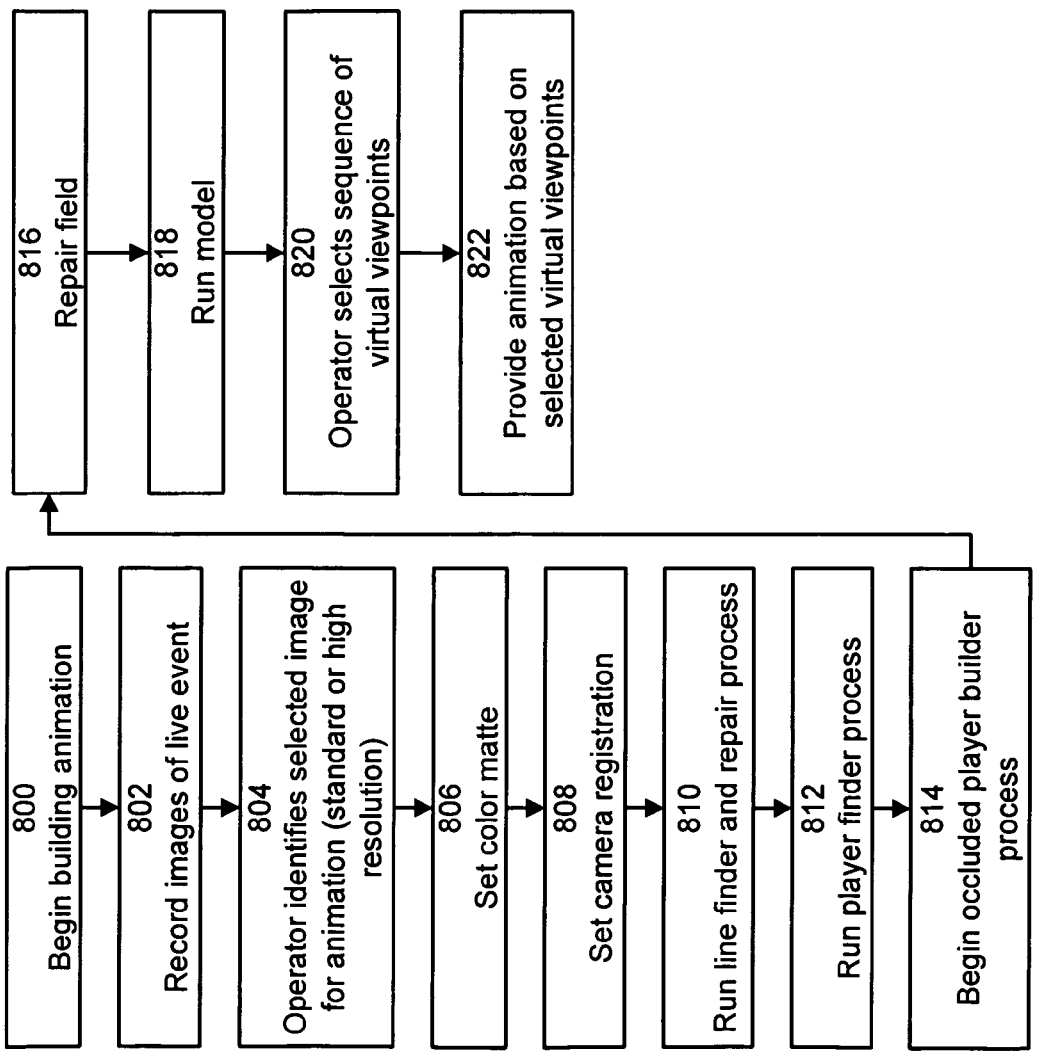
FIG. 8a depicts a process for building an animation.

FIG. 8a depicts a process for building an animation. Step 800 includes beginning to build an animation. Step 802 includes recording images of a live event, such as images from a video broadcast of the event. At step 804, an operator identifies a selected image to be used in an animation. This can occur essentially in real time as the event occurs, or at a later time. The selected image can be a standard resolution or high resolution image, as discussed in connection with FIG. 4.

In one approach, the event is a sports event in which there are periodic breaks. During the action of the event, an operator can note certain times in which events of interest occur, and can review those events later, such as during breaks in the action, to select an image to be used. For example, see the "Record Video" tab in the user interface of FIG. 6b. The operator can work under other tabs of the user interface while the video is being recorded. At step 806, the color matte is set, as explained further in connection with FIG. 6d. At step 808, camera registration is set, as explained further in connection with FIG. 6e. At step 810, a line finder and repair process is performed, as explained further in connection with FIGS. 5a-j. At step 812, a player finder process is performed, as explained further in connection with FIGS. 6a-c. At step 814, an occluded player builder process is performed, as explained further in connection with FIGS. 7a-e.

At step 816, a repair field process is performed. For example, FIG. 8e depicts a user interface 840 for repairing a playing field. After the players are identified by the player finder process, their images can be removed to provide an image which provides the background field and lines. This process may result in some artifacts, such as lines 842, 844 and 846, in addition to gaps in the actual field lines, such as gap 848. In one possible approach, the field can be repaired by running the line finder and repair process of step 810. In another approach, the operator can use drawing and editing tools to repair the field, such as by copying areas of the field over the errant lines to cover those lines, and copying and aligning portions of the image which have a line, or painting in the line, to fill in the gap 848. FIG. 8f depicts the user interface 840 of FIG. 8e after the playing field has been repaired, showing, e.g., how the gap 848 has been filled in.

At step 818, a model can then be run which includes the video texture of the repaired field applied to a 3d model of the event facility such as a sport stadium, in addition to 2d or 3d models of the players or other objects which are textured using the image data. The model can be rendered from different virtual viewpoints which differ from the viewpoint of the camera which provided the original image on which the model is based. For example, the virtual viewpoints can be offset left or right, up or down, from the camera's viewpoint, up to a certain amount at which distortion becomes unacceptable. Further, other features such as zooming in and out can be provided. Step 818 is explained further in connection with FIG. 9a. At step 820, the operator selects a sequence of virtual viewpoints which are generated by the model. For example, the operator may select virtual viewpoints which give the impression that the viewer is flying around and over the players on the field. At step 822, an animation is provided based on the selected virtual viewpoints. The animation can automatically fill in information for transitions between the selected viewpoints. For example, assume the viewpoint of the original image is as depicted in FIG. 9e, a first selected virtual viewpoint represent an approximately 20 degree rotation to the left of the camera viewpoint, as depicted in FIG. 9f, and a second selected virtual viewpoint represents an approximately 20 degree rotation to the right of the camera viewpoint, as depicted in FIG. 9g. In this case, the animation can provide transitions from the camera viewpoint to the first selected virtual viewpoint and then to the second selected virtual viewpoint. The amount of time of the transitions and the time spent at each virtual viewpoint can be configured by the operator or set to default values.

Generally, the animation can be built from one or more images of an event such as a sporting event or other live event. However, the animation can be built at any time, including at the time of the event or after the event, e.g., days or years later, from one or more recorded images of the event. Moreover, the event can be a static event in which there is no movement, such as the capturing of an image such as a photograph of scenery or people in a static pose, or a dynamic event which involves movement, such as players running on a field. The animation can be used in many different applications, in addition to providing interesting views in sports competitions, including surveillance and security monitoring applications, scientific applications, analysis of tennis or golf swing, and so forth.

FIG. 8b depicts a process for providing a presentation. Once the animation has been developed, it can be used in a video presentation with video images before and/or after the image which is the basis for the animation. The presentation begins at step 830. At step 831, images before the selected image used for the animation, e.g., pre-animation images, are played. For example, this can be a few seconds of video before an important play in a sports event. This sets up the context of the animation. At step 832, the animation is played. At step 828, images after the selected image used for the animation, e.g., post-animation images, are played. To provide a smooth transition, the first image of the animation can blend in with, and/or be the same as, a last image of the pre-animation sequence of images. Similarly, the last image of the animation can blend in with, and/or be the same as, a first image of the post-animation sequence of images. In one approach, the animation begins and ends at the same virtual viewpoint. The animation can also be played alone, without the pre- and/or post-images.

Figure 8D:
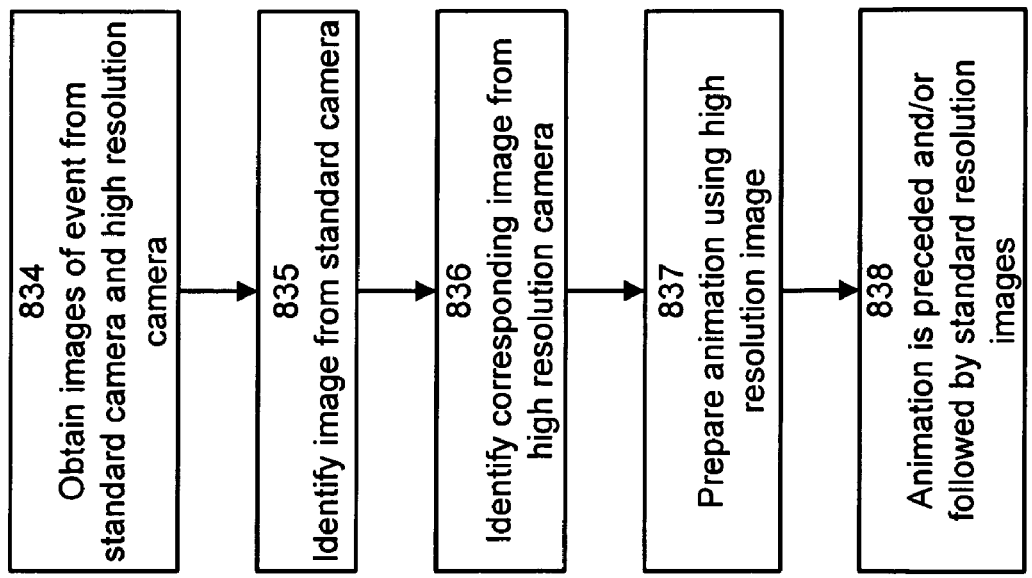
FIG. 8d depicts a process for providing a presentation using standard and high resolution images.
Figure 8C:
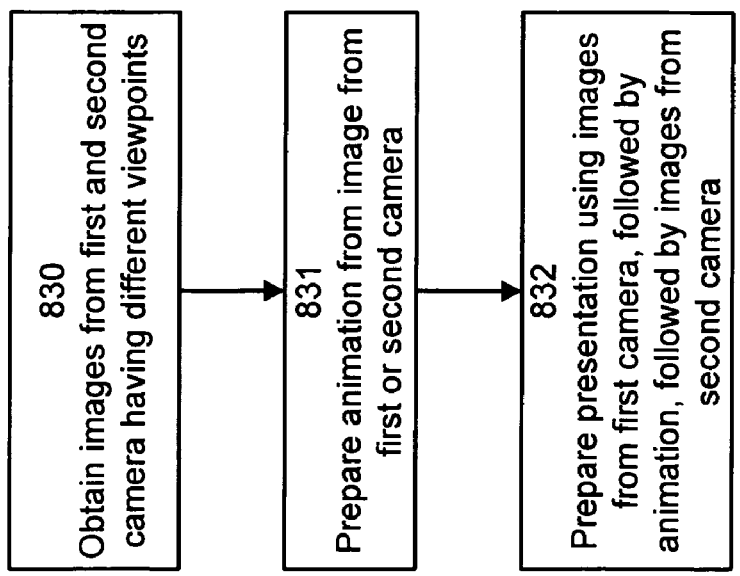
FIG. 8c depicts a process for providing a presentation using cameras with different viewpoints.

FIG. 8c depicts a process for providing a presentation using cameras with different viewpoints. It is possible for an animation to start and end at different virtual viewpoints. For example, images may be obtained from first and second cameras having different viewpoints (step 830). The cameras may be aimed at an event from different respective locations, or may be co-located but aimed differently. An animation can be prepared from an image from the first or second camera (step 831). A presentation can also be prepared using images from the first camera, e.g., which depict the real viewpoint of the first camera, followed by the animation, followed by images from the second camera, e.g., which depict the real viewpoint of the second camera (step 832). The first and second cameras can be broadcast video cameras, for instance.

In this case, the animation can start at a virtual viewpoint which corresponds to the real viewpoint of the first camera, transition to a sequence of other virtual viewpoints, and end at a virtual viewpoint which corresponds to the real viewpoint of the second camera. This can provide an even more interesting and dynamic presentation for the viewer. For example, the viewer may seem to view the event from one side of the field, fly over or around the field, then continue viewing the event from the other side of the field. FIG. 8d depicts a process for providing a presentation using standard and high resolution images. As discussed above, e.g., in connection with FIG. 4 and FIG. 5a, step 500, a high resolution camera and a standard camera can be used to obtain images of an event (step 834). When it is desired to provide an animation which depicts different virtual viewpoints, an operator can provide a command via an appropriate user interface, for instance, which identifies a specific image of interest from the standard camera (step 835). A corresponding image from the high resolution camera can further be identified from the identified image of the standard camera, e.g., based on a corresponding time (step 836). This can be done automatically, for instance. The image from the high resolution camera can then be used to provide a sequence of different virtual viewpoints in an animation (step 837). Using a high resolution camera for the different virtual viewpoints provides various benefits, as mentioned previously. Further, a presentation can be created in which the animation with different virtual viewpoints which are obtained using an image from the high resolution camera is followed by images of the standard camera. Alternatively, or additionally, in the presentation, the animation is preceded by images of the standard camera (step 838).

It is also possible to have multiple freeze points in a single animation or replay. For example, an animation can be prepared from multiple images from the first and/or second camera.

In one approach, the standard camera is a video camera such as an analog broadcast video camera and the high resolution camera is a digital still camera or a digital video camera. In another approach, the standard camera is a digital broadcast video camera and the high resolution camera is a digital still camera. Optionally, the standard camera and the high resolution camera are co-located.

Figure 9D:
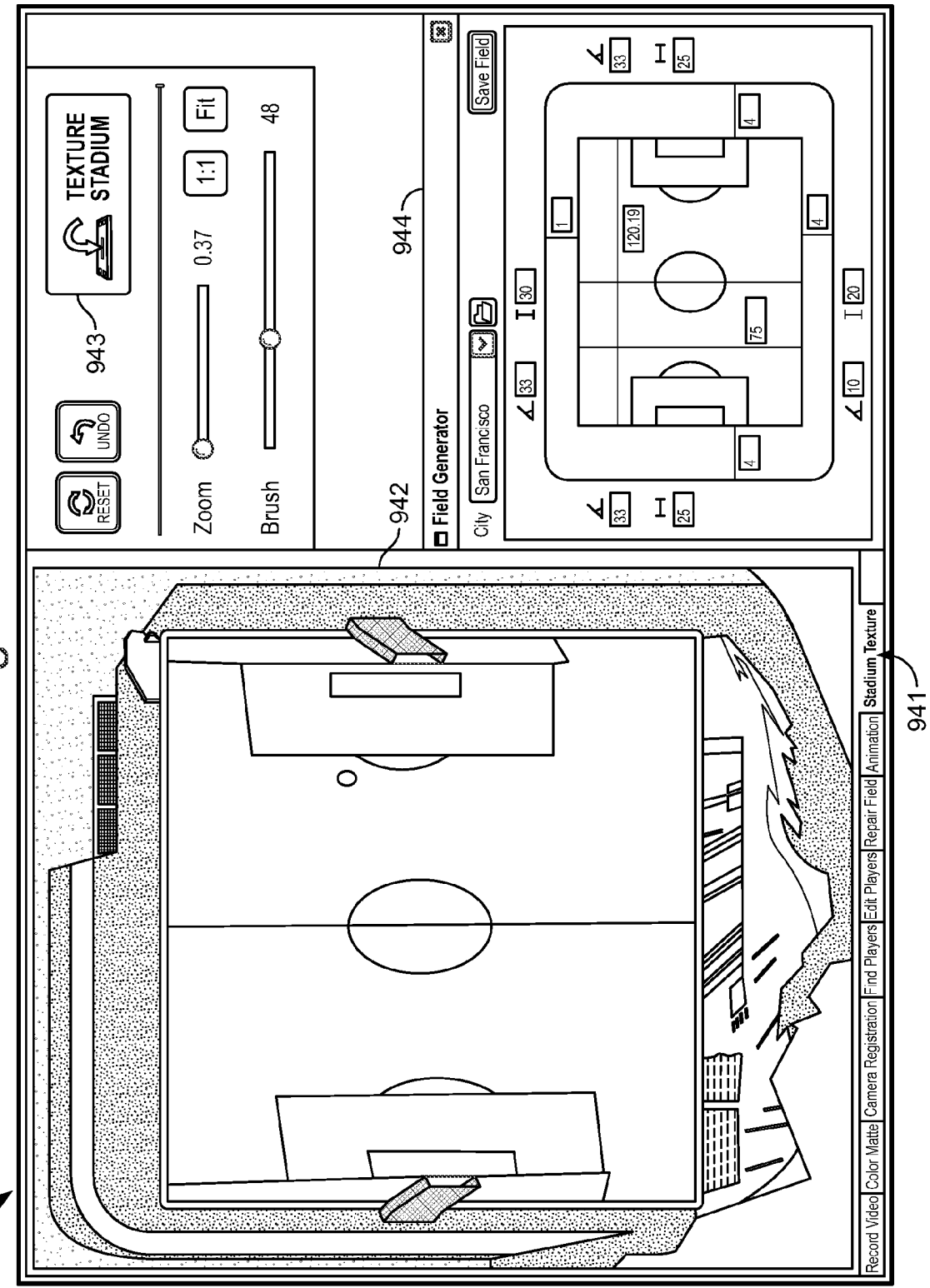
FIG. 9d depicts a user interface for providing a texture of a 3d model.
Figure 9E:
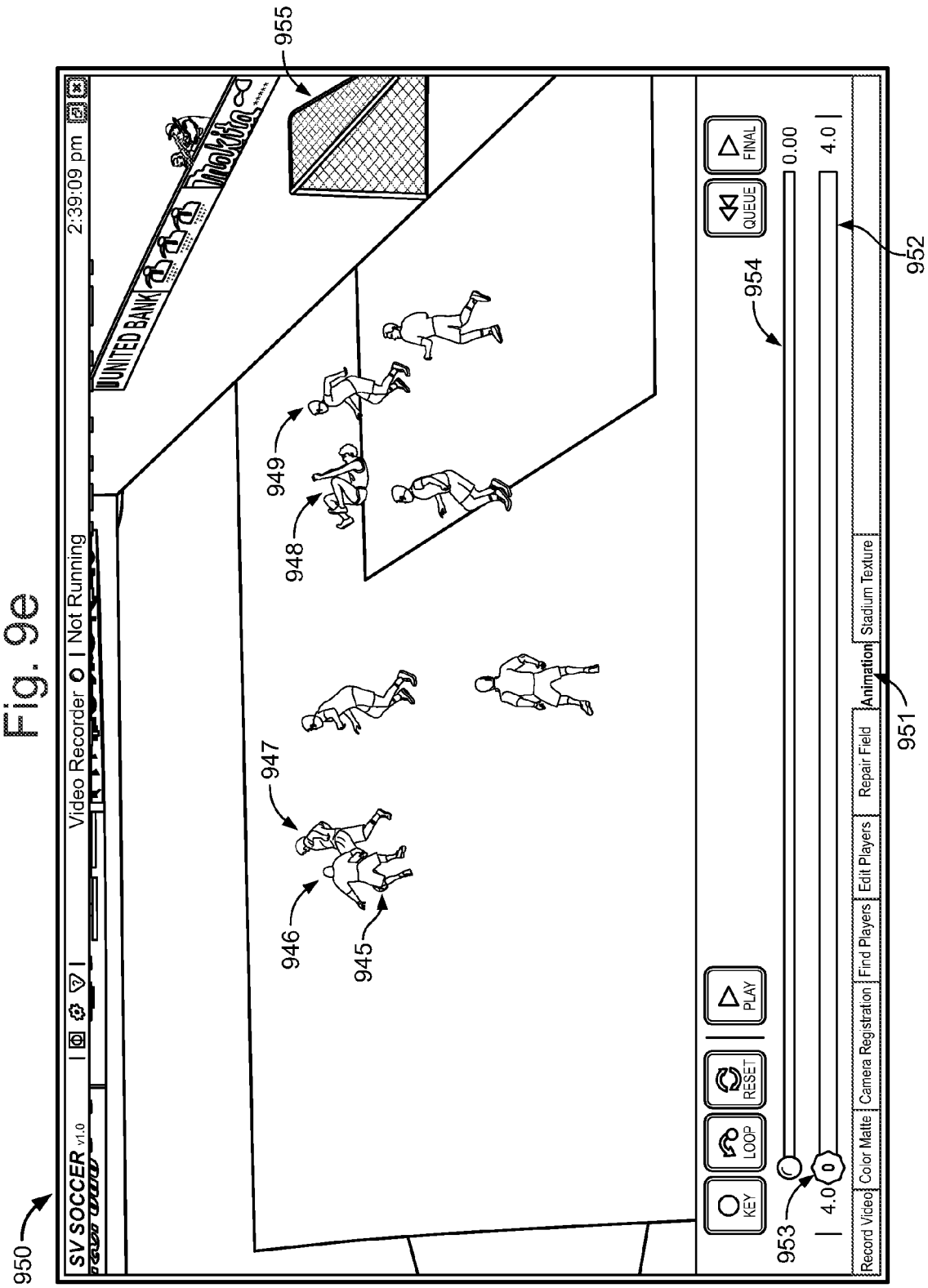
FIG. 9e depicts an initial image in an animation from a virtual viewpoint which corresponds to the perspective of a camera viewpoint.
Figure 9F:
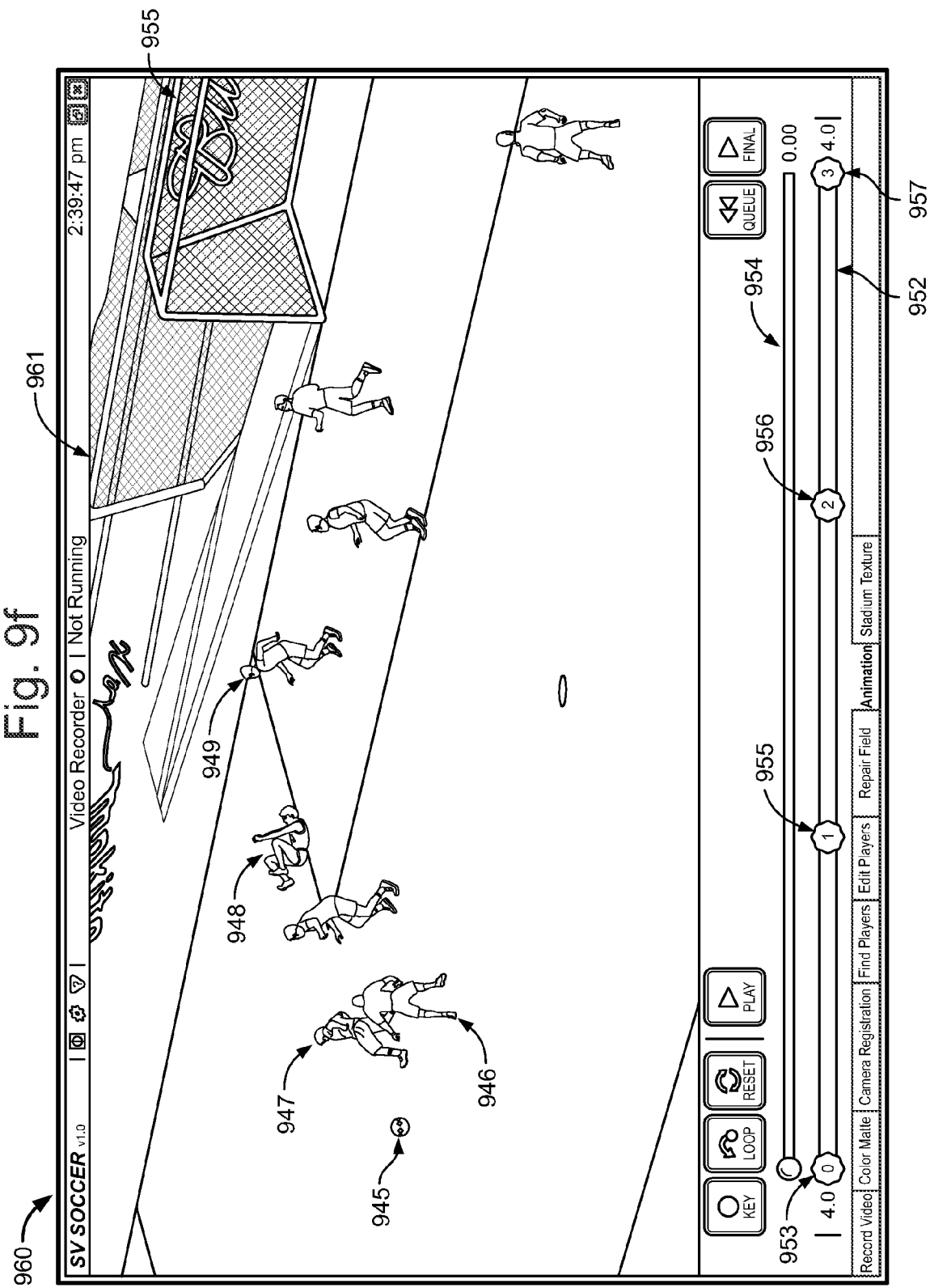
FIG. 9f depicts a second image in an animation which is obtained from a virtual viewpoint which is to the left of the camera viewpoint of FIG. 9e.
Figure 9G:
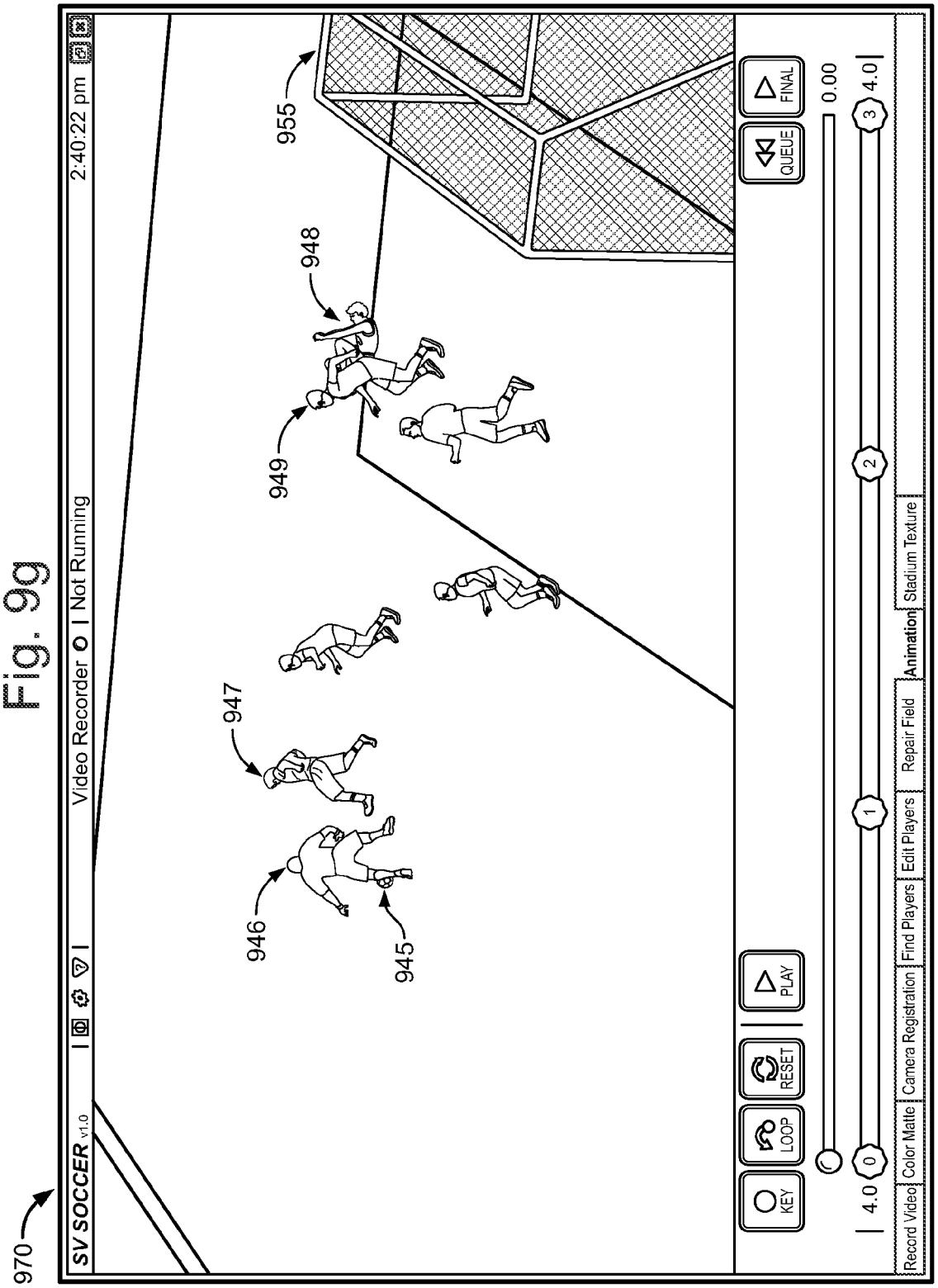
FIG. 9g depicts a third image in an animation which is obtained from a virtual viewpoint which is to the right of the camera viewpoint of FIG. 9e.

FIG. 9a depicts details of a process for rendering virtual viewpoints. Step 900 includes beginning creation of a model, which can be a 3d model of an event facility such as a sport stadium, in addition to 2d or 3d models of the players or other objects. Step 902 includes providing a stadium model with texture. For example, FIG. 9d depicts a user interface 940 for providing a texture of a 3d model. A "Stadium Texture" tab 941 is selected by the operator. A diagram 944 depicts a model of a stadium which can be configured by the operator, such as by entering information regarding the length and width of the playing field, the distance from the field to the grandstands on each side of the field, and the depth and angle of the grandstands. From this information, a 3d virtual model of the stadium can be created. Further, video texture can be applied to the model from images which are captured by one or more cameras at the stadium. Display region 942 depicts a current video texture of a stadium. A user interface device such as a button 943 allows the operator to update the texture of a stadium. Or, updating can occur automatically such as when a specified event occurs. See also FIG. 9c and the associated description.

Step 903 includes detecting an object in an image which is to be replaced by a virtual 3d object. For example, a goal post or other goal structure (e.g., as used in American football, soccer, hockey, basketball or lacrosse) may be detected in a sport event. The detection may be made automatically, e.g., without operator input, using image recognition techniques and knowledge of characteristics of the object and its location in the live event. For example, the known physical shape and color of the object can be used to assist detection. Further, the known predetermined location of the object in the live event and camera registration data can be used to assist detection. As an example, a goal post in a soccer game is typically white and has a specified size, shape and location in the live event in accordance with game regulations. The object can therefore be detected by examining pixels in a portion of the image which corresponds to the predetermined location in the live event. Once the object is detected, the pixels which make up the object can be removed. Optionally, the removed pixels can be automatically blended in with surrounding pixels, which might be green pixels of the field. Or some manual editing may be performed. However, generally such blending in or editing may not be needed as the virtual goal post which is used in the model accurately replaces the removed pixels. In one approach, the pixels are only replaced when viewing from the original (non-virtual) camera angle. Optionally, step 903 can be skipped.

Step 904 includes providing one or more 3d virtual objects in the model. For example, the image 950 of FIG. 9e includes a virtual goalpost 955, which can be created using known dimensions and characteristics of an actual goalpost. Note that the viewpoint of FIG. 9e is the same as the camera's viewpoint, so the virtual goal post essentially blends in with the image of the actual goalpost. The use of a virtual object, e.g., a 3d model of an object, such as a goalpost in the overall model provides greater realism when the model is viewed from different virtual viewpoints. In one approach, the virtual object does not have video texture applied to it from images which are captured by one or more cameras. For example, the color white for a goal post can be specified from a palette of colors rather than taken from the white pixels in an image. In contrast, the textured 3d model of the event has texture applied from one or more camera-captured images of the event. The virtual object can be located at a predetermined location in the live event, e.g., at the end boundary lines in a soccer game, and/or at a location which is based on the detection of step 903.

Step 906 includes providing 2d or 3d models of players with texture from the selected image which is used in the model. A 2d model can provide sufficient realism in many cases, particularly when the models of the players are rotated based on an angle of rotation of the virtual viewpoint. A 3d model can provide greater realism as well as allowing the players to be viewed from essentially any virtual viewpoint. In one approach, discussed further below, a 3d kinematics models of the players can be used. In providing the player models, video texture from one or more images from one or more cameras can be applied to the models. For example, multiple cameras arranged at different locations can be used, in which case texture from each camera can be combined. For example, for a virtual viewpoint which is the same as the viewpoint of a first camera, texture from an image of the player which is provided by the first camera can be applied to a player model. As the virtual viewpoint transitions away from the viewpoint of the first camera and toward the viewpoint of a second camera, texture from images of the player which are provided by both the first and second cameras can be applied to the player model. For example, more texture is applied from the image provided by the second camera as the virtual viewpoint becomes closer to the viewpoint of the second camera.

If the virtual viewpoint transitions to a viewpoint which results in too much distortion, the texture on the object can be replaced by a default texture such as a fixed color. For instance, if only one camera is available, and it provides texture for the front of a player, this texture should be adequate for virtual viewpoints which show the front of the player. However, the camera's image data will not be able to provide texture if the virtual viewpoint shows the back of the player. In this situation, the back of the player may be rendered by a fixed color. Or, a default player texture a texture from another player may be used to render the back of the player.

Step 908 includes rendering the stadium model, virtual 3d objects and models of players from selected viewpoints. For example, FIG. 9e depicts a rendering of the model from the virtual viewpoint which corresponds to a camera's viewpoint. FIGS. 9f and 9g depict renderings of the model from virtual viewpoint which are to the left and right, respectively, of the camera's viewpoint. Note that the realistic appearance of the virtual goalpost 955 in FIGS. 9e and 9h. In FIG. 9f, image data of the actual goalpost 961 is depicted to show the distortion that would occur if the virtual goalpost 955 was not used. In practice, the actual goalpost can be edited out by an operator, or left in if desired.

Various techniques for rendering different virtual viewpoints and for providing 2d or 3d models of humans or other objects can be used. For example, Hoiem et al., "Automatic Photo Pop-up," ACM SIGGRAPH 2005, incorporated herein by reference, discusses creating a 3d model from a single image. U.S. Pat. No. 5,850,352 to Moezzi et al., issued Dec. 15, 1998, incorporated herein by reference, discusses generating a 3d video mosaic from multiple video views of a scene. U.S. Pat. No. 6,390,933 to Sharir et al., issued Apr. 30, 2002, incorporated herein by reference, discusses generating a 3d video mosaic from multiple video views of a scene. US2005/0018045, published Jan. 27, 2005, titled "Video Processing," incorporated herein by reference, discusses rendering a view of a scene from a selected viewpoint using image data from a real image. U.S. Pat. No. 7,289,648 to Liu, issued Oct. 30, 2007, incorporated herein by reference, discusses modeling three dimensional objects from a single image. US2002/0158873 to Williamson, published Oct. 31, 2002, incorporated herein by reference, discusses inserting video images into a virtual environment.

Other examples are provided in Ahmed et al., "Automatic Generation of Personalized Human Avatars from Multi-view Video," Proc. of the ACM Symp. on Virtual Reality Software and Technology, 2005, pp. 257-260; Malerczyk et al., "3D Reconstruction of Sports Events for Digital TV," Journal of WSCG (Winter School on Computer Graphics), vol. 11., no. 1., February 2003; Remondino et al., "Human Motion Reconstruction and Animation from Video Sequences," 17th Int. Conf. on Computer Animation and Social Agents (CASA2004), pp. 347-354, July 2004; and W. Lee et al., "Generating Animatable 3D Virtual Humans from Photographs," Proc. Eurographics 2000, Vol. 19, No. 3, pp. 1-10, Aug. 2000, each of which is incorporated herein by reference.

Generally, 3d kinematics models model a human based on movement of different parts of the body. Kinematics models recognize that parts of the body can move in a known manner relative to one another within certain limitations. Furthermore, based on the event, certain movements can be modeled. For example, for a soccer game, movements such as running, kicking and so forth can be modeled. It may not be necessary to model all possible movements. Further, in one approach, a model can be provided which represents a generic player which has average physical characteristics, such as height and weight. It is also possible to provide different kinematics models for different sizes of players, e.g., small, medium and large. For some sporting events such as American football or hockey, where the players wear helmets, individual characteristics such as facial appearance are often hidden. In such cases, a generic model may be sufficiently realistic. However, it is also possible to provide kinematics models which are customized to individual players, e.g., including facial appearance, hair, skin color, presence of tattoos, and so forth of individual players. Further, clothing such as uniforms of different teams can be modeled.

Further, video texture from one or more images can be applied to such 3d models to provide enhanced realism in an animation. For example, in one approach, a 3d kinematics model of a player in a sport event is textured using image data from one or more cameras, and the textured 3d kinematics model is combined with a textured 3d model of the stadium to depict different virtual viewpoints. Thus, the same image which is used to provide a virtual viewpoint can be used to texture a kinematics model, in one possible approach. The optimal texturing of a 3d kinematics model can be determined using an optimization process.

FIG. 9b depicts a process for rotating and fading out players based on an angle of a virtual viewpoint. Step 920 includes rotating models of the players based on an angle of a virtual viewpoint. To provide additional realism, the 2d or 3d models of the players can be rotated by an angle which is based on the rotation of the virtual viewpoint, that is, an angular offset of the virtual viewpoint from the camera's viewpoint. The rotation can be about the pivot point of each player, as discussed in connection with FIGS. 7a-e. For example, the angle by which a player is rotated can be a fraction, e.g., 75% of the angular offset. Or, the angle by which the player is rotated can be a general function of the angular offset. In one approach, the rotation of the player is relatively greater for lower angular offset and is gradually less for higher angular offsets. For example, for an angular offset of 0-30 degrees, the rotation of the player can vary gradually from 90% (at 0 degrees) to 70% (at 30 degrees) of the offset.

Step 922 includes fading out one or more models of players based on the angle of the virtual viewpoint. As the angular offset of the virtual viewpoint becomes large, distortion can occur in the image as image data is not available to accurately depict a player. Generally, this constraint depends on the number and placement of cameras. It can be useful to fade out, e.g., partially or fully remove the image of a player, instantly or over a specified time period, e.g., in which the fading is apparent to a human viewer, based on an angular offset of the virtual viewpoint from an angle of the camera's viewpoint, based on the virtual viewpoint exceeding a specified difference from the viewpoint of the camera in regard to some other parameter, or based on other criteria. For example, an object can be at least partially faded out over multiple virtual viewpoints. Further, step 924 includes fading out a first player while still displaying a second player, in a given virtual viewpoint, and step 926 includes providing a marker in place of a faded out player. Generally, it can be useful to fade out one object but not another based on an angular offset of the virtual viewpoint. For example, a first player which does not occlude a second player in a first virtual viewpoint may begin to occlude the second player in a second virtual viewpoint. For instance, the virtual viewpoints of FIGS. 9e and 9f depict players 948 and 949 as distinct players which do not occlude one another. However, the virtual viewpoint of FIG. 9g depicts player 949 at least partly occluding player 948. This may not be desirable if it is desired to focus on player 948. FIG. 9h depicts the same virtual viewpoint of FIG. 9g, but player 949 has been faded out and replaced by a marker 981. As a result, the player 948 can be seen from this virtual viewpoint without being occluded. To achieve this, in one approach, the operator can select the virtual viewpoint of FIG. 9h and indicate via a user interface that player 949 is to be removed and replace by a marker, or just removed and not replaced by any marker. When the animation is subsequently played, player 949 will be faded out when the virtual viewpoint of FIG. 9h is reached.

In another possible approach, the model may be configured so that any player which is occluding another player is faded out. Or, only selected players may be identified to be faded out when they occlude another player. Or, only selected players may be identified so that other players which occlude them are faded out when the occlusion occurs. The determination of whether one player occludes another can be made automatically by the model, such as by determining if there are overlapping lines of position from each player to an origin of the virtual viewpoint. The degree of occlusion can further be factored in to determining whether and when an occluding player should be faded out.

In another example, consider an image of a baseball game in a virtual viewpoint which shows the pitcher, catcher and umpire. As the virtual viewpoint transitions to a viewpoint which is behind the umpire and catcher, the umpire and catcher can be faded out in order to see the pitcher and the pitched ball.

Fading of selected players is an advantage in that it allows the viewer to better see how the players align themselves on the field, who is blocking who, and so forth.

FIG. 9c depicts a process for texturing a 3d model. As discussed in connection with FIG. 9d, a user interface 940 displays a video texture in a display region 942 which is applied to a stadium or other event facility or location. Step 930 includes building a stadium model. For example, a diagram 944 allows an operator to specify a geometry of the stadium for use in the model. In the current example, the length of the field is 120.19 yards, the width is 75 yards, the distance from the field to the advertising boards of the grandstands on each side of the field is 1 yard (top), and 4 yards (right, bottom and left sides). The depth and angle of the grandstands is 30 yards and 33 degrees (top), 25 yards and 33 degrees (right side), 20 yards and 10 degrees (bottom), and 25 yards and 33 degrees (left side). While the example provided shows a stadium with a rectangular configuration, other configurations may be provided as well. Once the geometry is specified, video texture from one or more cameras can be applied (step 932), e.g., to obtain an initial textured 3d model of the stadium or other event facility. Note that applying the texture to a 3d model results in greater realism than applying texture to a plane.

For instance, video texture can be applied from images which are obtained prior to, and/or during the event. At step 934, the texture is updated, e.g., based on a user command (on demand), or automatically based on detection of a specified event. A user interface device such as a button 943 allows the operator to update the texture of a stadium, such as from a current image. An updated textured 3d model of the event can be obtained by updating the initial textured 3d model. Moreover, updating can occur automatically when a specified event occurs. The specified event can be a specified time, e.g., after a specified period has passed since a last update or at specified times of day, e.g., relative to sunset or sunrise. The appearance of a stadium can change due to various factors, such as changing lighting in the stadium (e.g., due to presence of sun or clouds, or due to use or non-use of stadium electric lights), changes in the number of fans in the stands, changes in advertisements or signs in the stadium, movement of a roof of the stadium or other reconfiguration of the stadium or other event site, and so forth. In one approach, the texture is updated when an image used in an animation is captured. The determination of whether a specified event occurs which should trigger automatic updating of the texturing can be achieved in different ways, such as a light sensor to detect ambient light level, or a sensor which detects whether stadium lights have been turned on, for instance. Similarly, a timing device or process can be used to determine if a specified period has passed since last update or a specified time of day is reached.

It can be helpful to texture the model before a sports event begins, when there are no players and on the field and therefore no occlusions.

FIG. 9e, discussed earlier, depicts an initial image in an animation from a virtual viewpoint which corresponds to the perspective of a camera viewpoint. The "Animation" tab 951 is selected by the operator. The user interface 950 provides the image, which includes players 946-949, a ball 945, and a 3d model goalpost 955. Further, tools are provided for creating an animation. For example, a time line 954 indicates an elapsed time of the animation, which is currently zero in this display. An icon 953 can be selected by the operator to designate the current image as the first image of the animation. A bar 952 depicts a sequence of selected images, once they are selected, and allows the operator to set the amount of time each image should be display as well as the amount of time between different images.

FIG. 9f, discussed earlier, depicts a second image in an animation which is obtained from a virtual viewpoint which is to the left of the camera viewpoint of FIG. 9e as well as being zoomed in somewhat. In the user interface 960, the bar 952 indicates that four other images have been selected for the animation, based on the icons 953, 955, 956 and 957. The operator can click on any of the icons to view the corresponding image. Further, the operator can manipulate the virtual viewpoint such as by clicking on a portion of the image and dragging the image. Note that the ball 945 can also be provided as a virtual 3d model which is positioned by the operator. Also, note that the player 947 can be fully seen. This player is a repaired player in which the missing leg was added in, as discussed previously. FIG. 9g, discussed earlier, depicts a third image in an animation which is obtained from a virtual viewpoint which is to the right of the camera viewpoint of FIG. 9e. FIG. 9h, discussed earlier, depicts the third image of FIG. 9g in which one of the players is replaced by a marker 981.

FIG. 10a depicts a process for enabling a user to run an animation. In one approach, an animation which provides different virtual viewpoints of a live event is created by an operator, such as a technician, who is associated with a television broadcast company, and the animation is provided as part of the broadcast, such as during a replay of a particular event of interest, or during a half time analysis show. The viewer/user at his or her home may not have any control of the creation of playback of the animation in this approach. In another approach, the user can be provided with such a capability. This can provided added entertainment to the user. Further, a service provider may charge a fee for this added capability, resulting in additional revenue.

Step 1000 includes obtaining images of a live event. Step 1002 includes providing a model for one or more selected images. For example, this can include providing 2d or 3d data for each player, including associated texture data from the image, as well as 3d texture data from a stadium or other event facility and a 3d model of objects such as goal posts which are to be included. The data can be provided in any suitable format, and can be accessed by the user to run the model based on the user's commands. Alternatively, or additionally, an animation which has already been created can be provided. Step 1004 includes providing data identifying the selected images, such as lower resolution thumbnail images as preview images. Step 1006 includes transmitting the images and auxiliary data which includes the model and the data identifying the selected images to users. Step 1008 includes a user accessing the images and auxiliary data to run the model.

In one possible approach, the images and auxiliary data are provided in a conventional analog or digital television broadcast. In another approach, the image is provided in a television broadcast and the auxiliary data is provided via a separate channel, such as via a computer network. In this approach, the user may access a web site via a host computer to access the auxiliary data. See also the user system of FIG. 3b, which includes components for providing the functionality described. The host computer can be separate from a television or included with a television. In another approach, both the images and the auxiliary data are provided via a computer network.

FIG. 10b depicts a user interface which allows a user to select from available animations. During or after a broadcast of an event, the user can access a menu 1010 of available animations. In the example provided, the menu 1010 identifies a first animation which relates to a $1^{st}$ quarter goal by team A, and includes a thumbnail image 1012 of the animation. The thumbnail image can be a camera image or an image from a 3d model of the animation. The menu 1010 also identifies a second animation which relates to a $2^{nd}$ quarter blocked kick by team B, and includes an associated thumbnail image 1014.

FIG. 10c depicts a user interface 1020 which allows a user to run an animation. In one approach, the animation has been created and the user has the ability to start and stop the animation. In another approach, the user has the ability to run the model to view different virtual viewpoints. Optionally, the user is provided with capabilities which are similar to those provided to the operator as discussed previously, such as the capability to identify specific virtual viewpoints and to create an animation from these viewpoints. Here, the user can run the model to view different virtual viewpoints. The user is informed that he or she can move a cursor to change a point of view, e.g., a virtual viewpoint. This may be considered to be a manual mode in which the user selects the viewpoint. A display region 1022 also gives the user the ability to run a predefined script, select a particular camera and to reset all entries. A predefined script can provide a predefined sequence of virtual viewpoints.

FIG. 10d depicts a user interface 1030 which allows a user to select a camera viewpoint for an animation. In some cases, separate models may be provided based on separate cameras, in which case the user can select a particular camera, C1-C3, based on a diagram which shows it location in the event. In other cases, a single model is provided based on multiple cameras, in which case the user can select a camera which represents a viewpoint of interest.

The user interfaces may be associated with a host computer and/or at least one processor which is associated with a process-readable storage device which stores processor-readable code, in one approach. The at least one processor executes the processor-readable code to carry out the functionality described herein.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application, to thereby enable others skilled in the art to best utilize the invention in various embodiments and with various modifications as are suited to the particular use contemplated. It is intended that the scope of the invention be defined by the claims appended hereto.

What is claimed is:

1. A method for automatically finding and repairing lines in image data of a live event, comprising:
   obtaining an image of the live event from a camera, the live event includes a scene having at least one line segment which includes a portion which is occluded by an object, the object having a width which is greater than a width of the portion;
   forming a mask image from the image obtained from the camera;
   automatically detecting the at least one line segment in the mask image;
   automatically determining that the portion of the at least one line segment is occluded by the object;
   automatically removing the object;
   automatically repairing the portion of the at least one line segment which is occluded by the object to provide a repaired portion of the at least one line segment; and
   depicting at least one virtual viewpoint of the live event which is rotated by an angular offset from a viewpoint of the camera, the at least one virtual viewpoint of the live event uses texture from the image of the live event and includes the repaired portion of the at least one line segment.

2. The method of claim 1, wherein:
   the automatically detecting comprises obtaining points from vertical and horizontal scanning of segments in the mask image, finding center points of the segments of the mask image from intersections of the points from the vertical and horizontal scanning, applying a Hough transform using the center points, and finding at least one straight line segment based on the Hough transform.

3. The method of claim 2, wherein:

the automatically detecting comprises discarding center points of the at least one straight line segment, and chaining together remaining center points which are on a continuous curve and which have a tangent angle which is less than a threshold angle.

4. The method of claim 1, wherein:

the automatically determining comprises determining an average width of a plurality of detected line segments in the mask image, comparing a width of the object to the average width, and determining that the width of the object exceeds the average width by a margin.

5. The method of claim 1, further comprising:

combining data of a textured 3d model of the event and data from the image obtained from the camera, with the object removed and the portion repaired, to depict the at least one virtual viewpoint of the event.

6. The method of claim 1, wherein:

the portion of the at least one line segment which is occluded by the object is next to a portion of the at least one line segment which is not occluded by the object; and the at least one virtual viewpoint of the live event includes the portion of the at least one line segment which is not occluded by the object.

7. The method of claim 6, wherein:

the automatically repairing includes filling in pixel data of the portion of the at least one line segment which is occluded by the object using the portion of the at least one line segment which is not occluded by the object.

8. The method of claim 6, wherein:

the live event is a sporting event which is played on a field, the at least one line segment is a field line on the field, and the object is a participant in the sporting event.

* * * * *